US009166908B2

(12) United States Patent
Vasseur

(10) Patent No.: US 9,166,908 B2
(45) Date of Patent: Oct. 20, 2015

(54) ASSISTED INTELLIGENT ROUTING FOR MINIMALISTIC CONNECTED OBJECT NETWORKS

(75) Inventor: Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 973 days.

(21) Appl. No.: 13/331,686

(22) Filed: Dec. 20, 2011

(65) Prior Publication Data

US 2013/0159550 A1   Jun. 20, 2013

(51) Int. Cl.
*G06F 15/173*      (2006.01)
*H04L 12/717*      (2013.01)
*H04L 12/701*      (2013.01)
(Continued)

(52) U.S. Cl.
CPC ............ *H04L 45/42* (2013.01); *H04L 41/0823* (2013.01); *H04L 41/12* (2013.01); *H04L 41/5019* (2013.01); *H04L 45/00* (2013.01); *H04L 45/02* (2013.01); *H04L 45/021* (2013.01); *H04L 45/12* (2013.01); *H04L 45/126* (2013.01); *H04L 45/14* (2013.01); *H04L 45/20* (2013.01); *H04L 45/44* (2013.01); *H04L 45/70* (2013.01); *H04W 40/248* (2013.01); *Y04S 40/164* (2013.01)

(58) Field of Classification Search
CPC ... H04L 41/0823; H04L 45/00; H04L 45/021; H04L 45/12; H04L 45/126; H04L 45/14; H04L 45/20; H04L 45/44; H04L 45/70
See application file for complete search history.

(56) References Cited

U.S. PATENT DOCUMENTS

| 7,373,660 B1 | 5/2008 | Guichard et al. |
| 2007/0025274 A1 | 2/2007 | Rahman et al. |

(Continued)

FOREIGN PATENT DOCUMENTS

| EP | 0753979 A1 | 1/1997 |
| WO | WO-03061175 A2 | 7/2003 |
| WO | WO-2006044217 A1 | 4/2006 |

OTHER PUBLICATIONS

Dimitrelis, et al., "Autoconfiguration of Routers Using a Link State Routing Protocol", draft-dimitri-zospf-00.txt, IETF Internet Draft, Oct. 2002, 17 pages.

(Continued)

*Primary Examiner* — Le H Luu
(74) *Attorney, Agent, or Firm* — Parker Ibrahim & Berg LLC; James M. Behmke; Stephen D. LeBarron

(57) ABSTRACT

In one embodiment, a distributed intelligence agent (DIA) collects local state information from a plurality of minimalistic connected objects (MCOs) in a computer network, the local state information for each MCO comprising a corresponding neighbor list and a selected next-hop for the respective MCO, where one or more of the MCOs are configured to select their next-hop without any self-optimization. The DIA may then analyze a current routing topology, which is the combined result of the selected next-hops, in comparison to a computed optimal routing topology, and (optionally) in light of required service level agreement (SLA), to determine whether to optimize the current routing topology. In response to determining that the current routing topology should be optimized, the DIA may transmit a unicast routing instruction to one or more individual MCOs to instruct those individual MCOs how to optimize the current routing topology, accordingly.

21 Claims, 18 Drawing Sheets

(51) Int. Cl.
*H04L 12/24* (2006.01)
*H04L 12/755* (2013.01)
*H04L 12/721* (2013.01)
*H04L 12/733* (2013.01)
*H04W 40/24* (2009.01)
*H04L 12/751* (2013.01)

(56) References Cited

U.S. PATENT DOCUMENTS

| | | |
|---|---|---|
| 2007/0086358 A1 | 4/2007 | Thubert et al. |
| 2007/0189193 A1 | 8/2007 | Previdi et al. |
| 2009/0086663 A1 | 4/2009 | Ho et al. |
| 2009/0296710 A1 | 12/2009 | Agrawal et al. |
| 2011/0231573 A1 | 9/2011 | Vasseur et al. |

OTHER PUBLICATIONS

Winter, et al., "RPL IPv6 Routing Protocol for Low Power and Lossy Networks", draft-ietf-roll-rpl-19, IETF Internet Draft, Mar. 2011, 164 pages.

Barrio Baranano, et al., "Notification of Transmittal of the International Search Report and the Written Opinion of the International Searching Authority, or the Declaration", Patent Cooperation Treaty, May 13, 2013, 14 pages, PCT/US2012/070942, European Patent Office, Rijswijk, Netherlands.

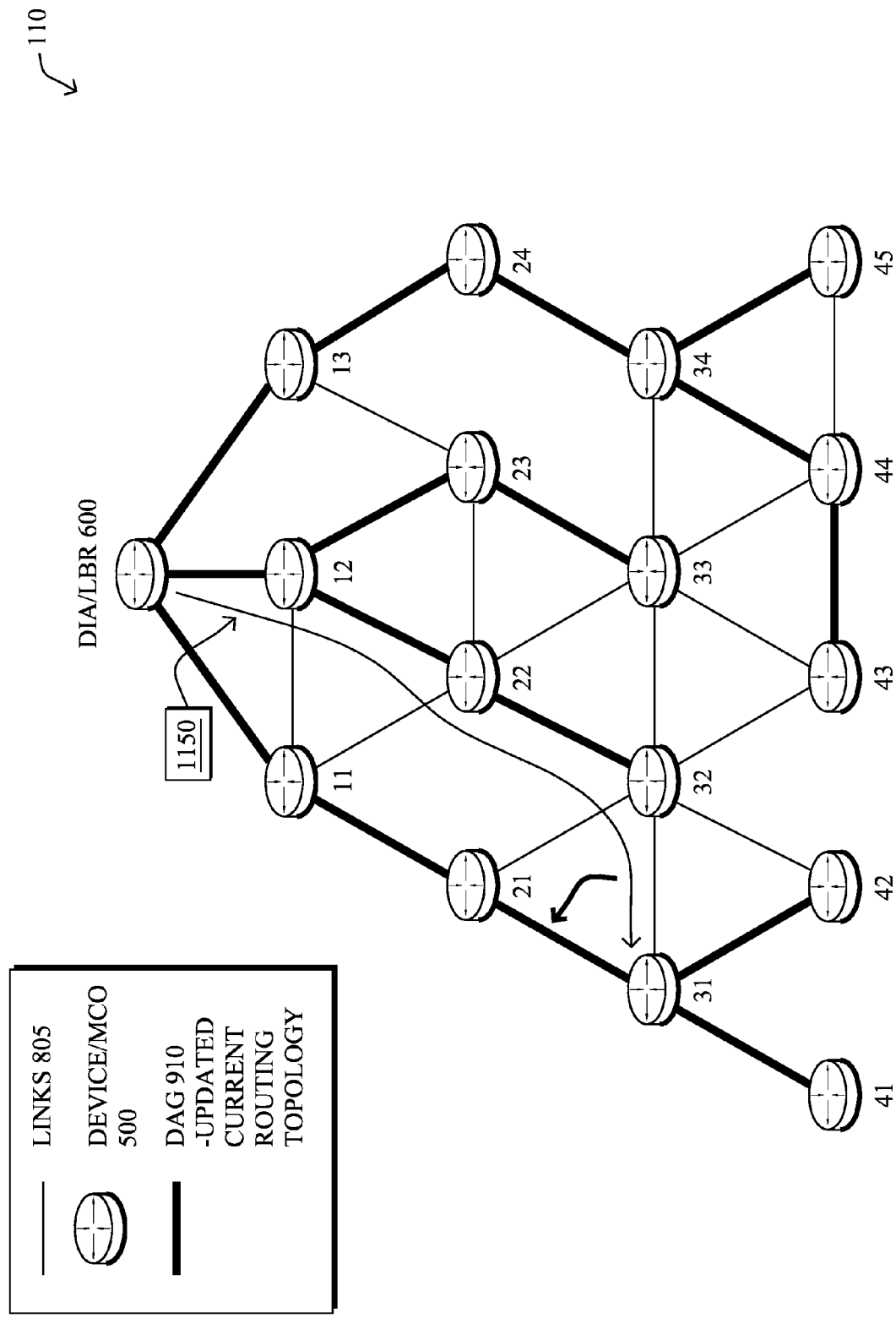

ASSISTED INTELLIGENT ROUTING FOR MINIMALISTIC CONNECTED OBJECT NETWORKS

TECHNICAL FIELD

The present disclosure relates generally to computer networks.

BACKGROUND

Low-power and Lossy Networks (LLNs), e.g., sensor networks, have a myriad of applications, such as smart grid, smart cities, home and building automation, etc. Various challenges are presented with LLNs, such as lossy links, low bandwidth, battery operation, low memory and/or processing capability, etc. Large-scale IP smart object networks pose a number of technical challenges. For instance, the degree of density of such networks (such as Smart Grid networks with a large number of sensors and actuators, smart cities, or advanced metering infrastructure or "AMI" networks) may be extremely high: it is not rare for each node to see several hundreds of neighbors.

One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. One of the core aspects of RPL lies in the use of an Objective Function (OF) configured on the DAG Root that determines the rules according how nodes join the DAG: the OF specifies the list of metrics and constraints used to build the DAG in addition to a number of rules and objectives. A typical OF in Smart Metering applications may be: "find the shortest path based on the reliability metric (thus the most reliable path), while avoiding battery operated nodes." A typical OF in substation automation applications may be "find the shortest path based on the delay metric (shortest delay) while using encrypted links."

RPL, and other complex routing protocols, are certainly very much appropriate to routing in existing networks comprising thousands of nodes. That being said, such protocols are fairly sophisticated with a number of available parameters, tuning, optional building blocks, and may be difficult to operate in constrained network. For example, current estimates show that RPL would require a few Kbytes of RAM for state maintenance and slightly more memory in terms of Flash. Unfortunately, the level of complexity inherent to the challenges of routing in LLN using a distributed routing approach grows rapidly with the number of nodes in the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 11A-11B illustrate examples of iterative optimization of the current routing topology of FIG. 9;

DESCRIPTION OF EXAMPLE EMBODIMENTS

Overview

Figure 1:
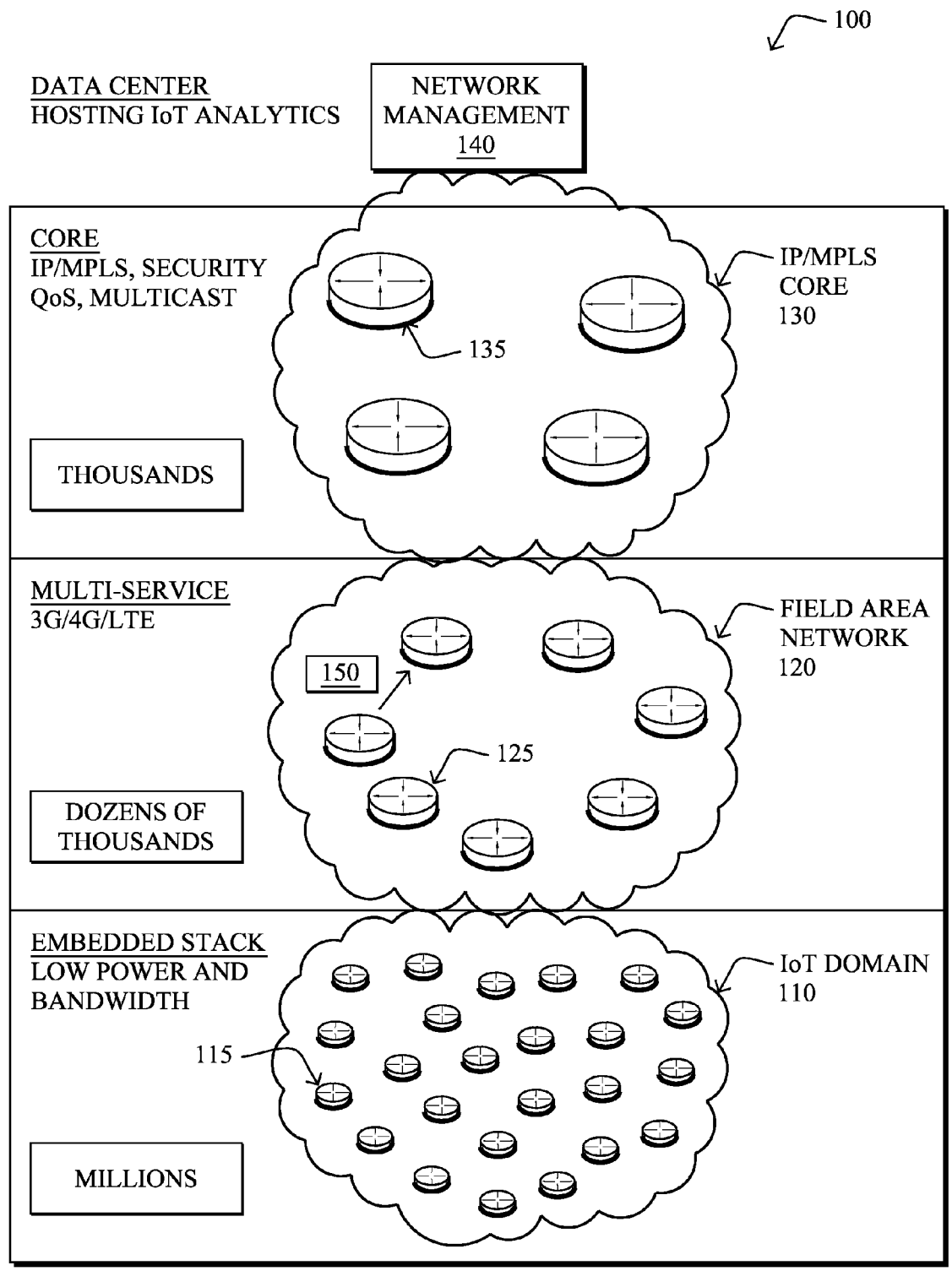
FIG. 1 illustrates an example computer network.

According to one or more embodiments of the disclosure, a distributed intelligence agent (DIA) collects local state information from a plurality of minimalistic connected objects (MCOs) in a computer network, the local state information for each MCO comprising a corresponding neighbor list and a selected next-hop for the respective MCO, where one or more of the MCOs are configured to select their next-hop without any self-optimization. The DIA may then analyze a current routing topology, which is the combined result of the selected next-hops, in comparison to a computed optimal routing topology to determine whether to optimize the current routing topology. In response to determining that the current routing topology should be optimized, the DIA may transmit a unicast routing instruction to one or more individual MCOs to instruct those individual MCOs how to optimize the current routing topology, accordingly.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example computer network 100 illustratively comprising nodes/devices interconnected by various methods of communication. For instance, the links (not shown) may be wired links or shared media (e.g., wireless links, PLC links, etc.) where certain nodes, such as, e.g., routers, sensors, computers, etc., may be in communication with other nodes, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

According to the illustrative network 100, a plurality of network "hierarchies" may be created, where each hierarchy may, though need not, consist of a generally disparate type of device and/or communication protocol. As shown, an IoT domain 110 (also referred to as an LLN 110) may consist of an embedded stack of "objects" 115, such as sensors, actuators, etc., as described above, interconnected by generally low-power and/or lossy links. Illustratively, the IoT domain may conceivably consist of millions of objects 115.

Each IoT domain 110 (only one shown for clarity) may be interconnected to a next hierarchical level, such as a field area network 120, which illustratively provides the edge of the "cloud" or core network 130. The field area network(s) 120 may interconnect one or more IoT domains to the core network 130, and generally comprises a plurality of routers 125 (or switches or gateways). In an example embodiment, communication at the field area networks may comprise multi-service protocols, such as "3G," "4G," "LTE," etc., as will be clearly understood in the art. Typically, the number of devices 125 within a field area network could reach dozens of thousands.

Ultimately, as noted, the field area networks 120 (one shown for clarity) are interconnected by a core network 130, such as an Internet Protocol (IP) network and/or Multi-Protocol Label Switching (MPLS) network of generally more-capable devices 135 (e.g., thousands of them), such as core routers, switches, etc. Generally, this hierarchical level controls the security, quality of service (QoS), multicast operation, etc. of the IoT domain in addition to supporting these features within the Field Area Network itself. A network management component 140 may exist within the core network 130, or else may be interconnected via the core network 130, to provide various high-level functionality, such as hosting of IoT analytics, network management services (NMS), etc. For example, the network management component 140 may consist of one or more servers configured to provide high-level control over the network operations of network 100, and may provide an interface to users (administrators), as described herein.

Data packets 150 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. As mentioned, each hierarchy may, though need not, utilize a different protocol than each other, and may, in fact, utilize a different protocol than other sub-domains within a hierarchy (e.g., different IoT domains 110 or field area networks 120).

Figure 2A:
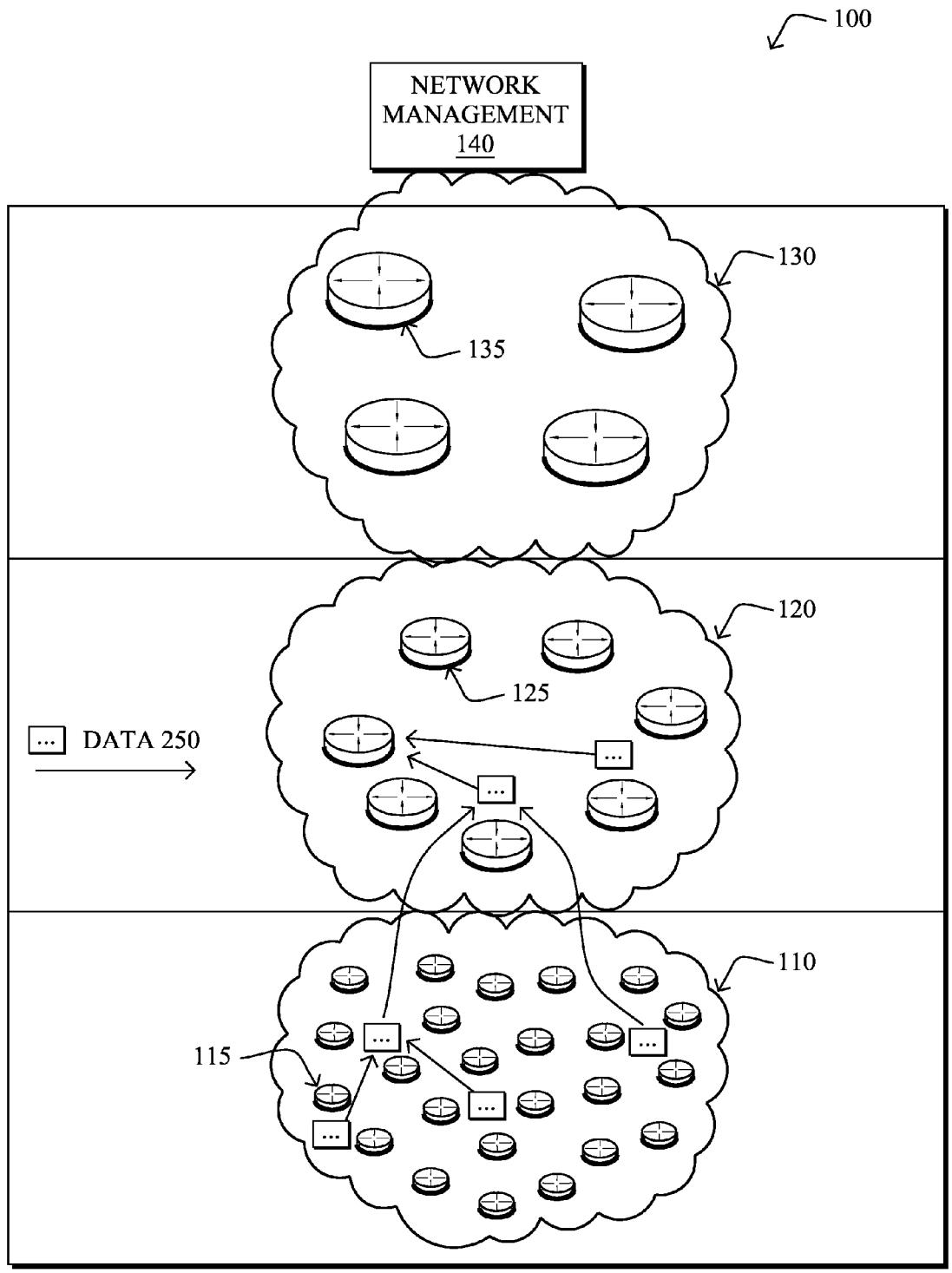
FIGS. 2A-2E illustrate examples of data flow within the computer network of FIG. 1.
Figure 2B:
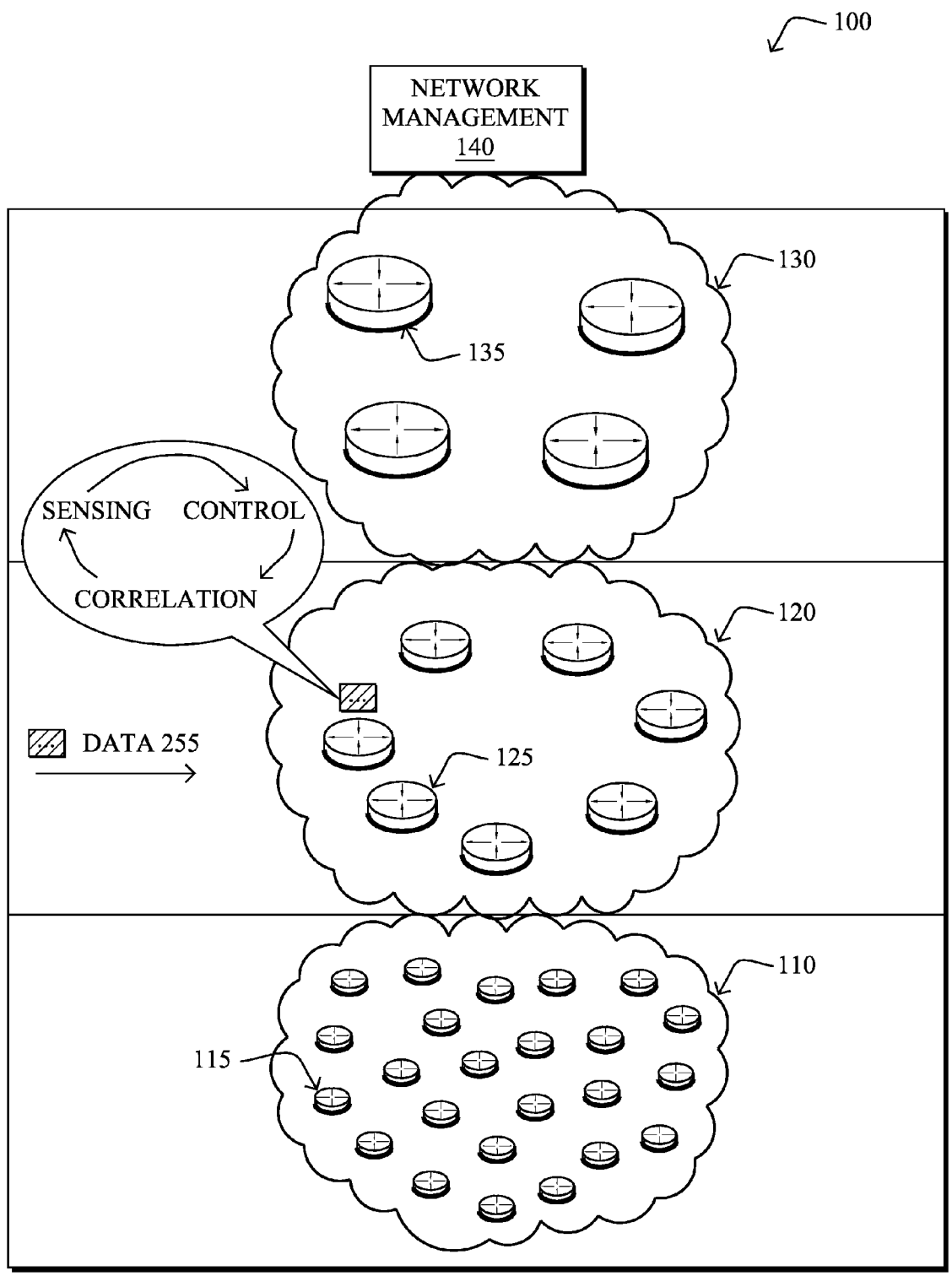
Figure 2C:
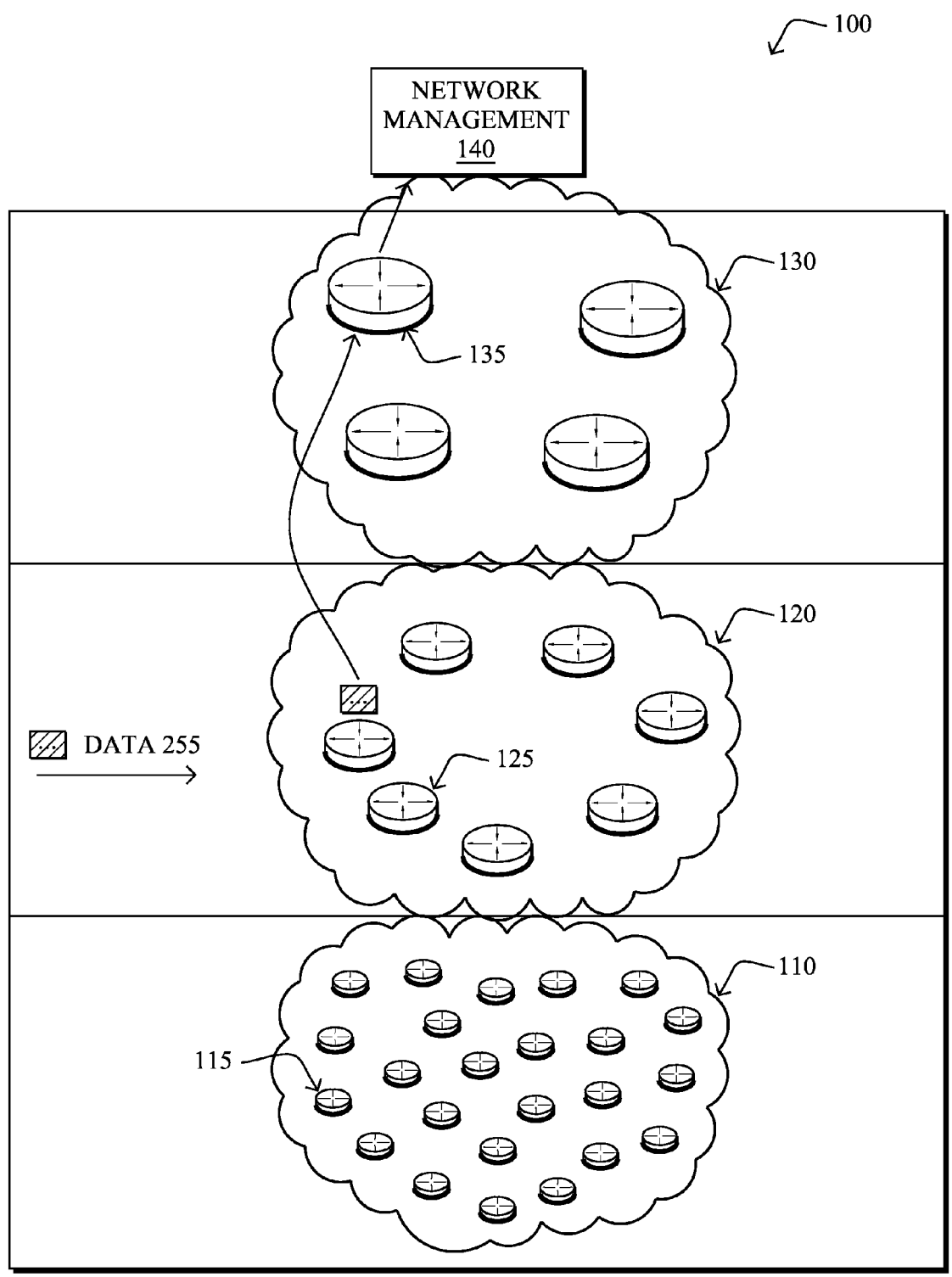
Figure 2D:
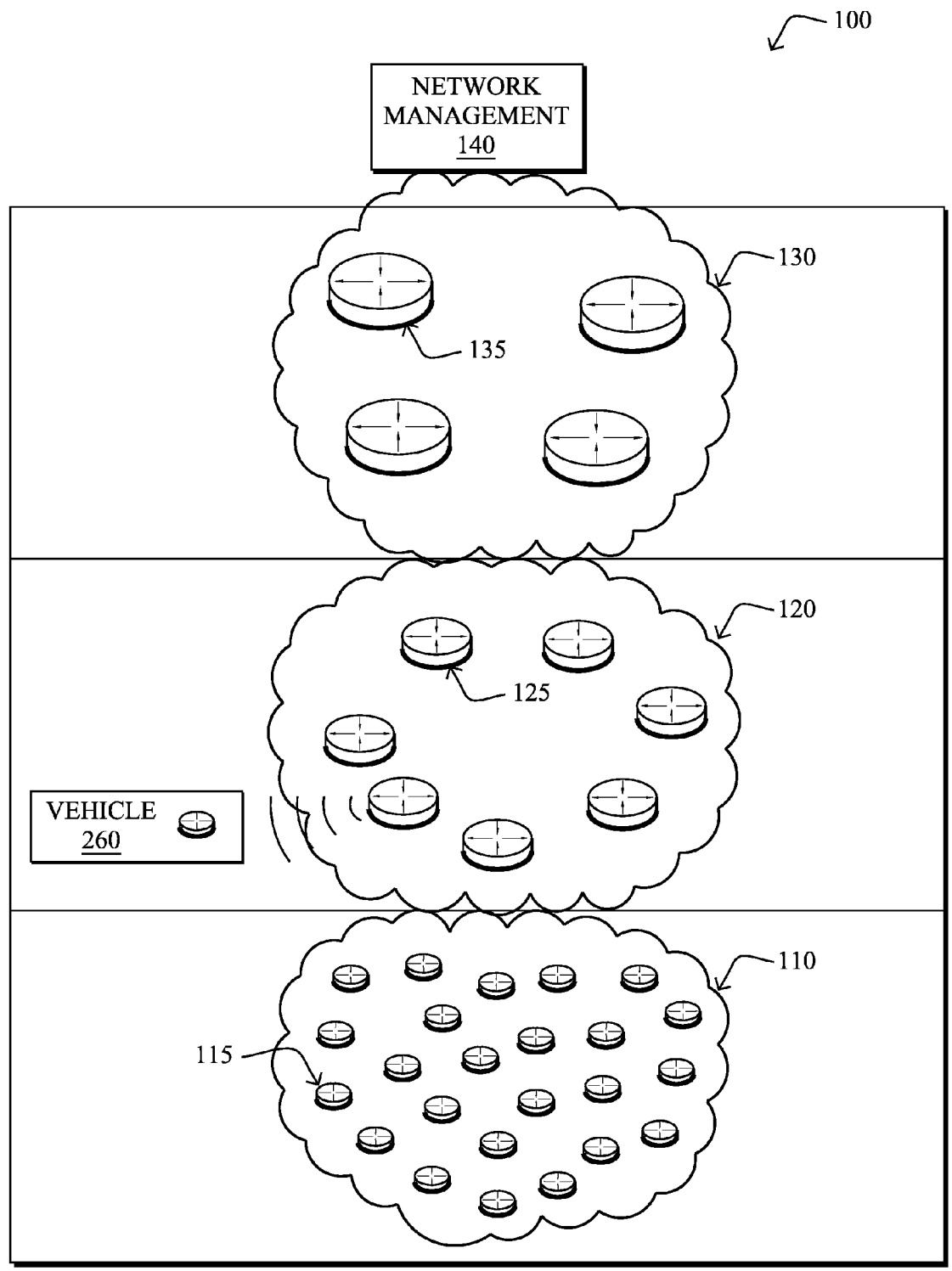
Figure 2E:
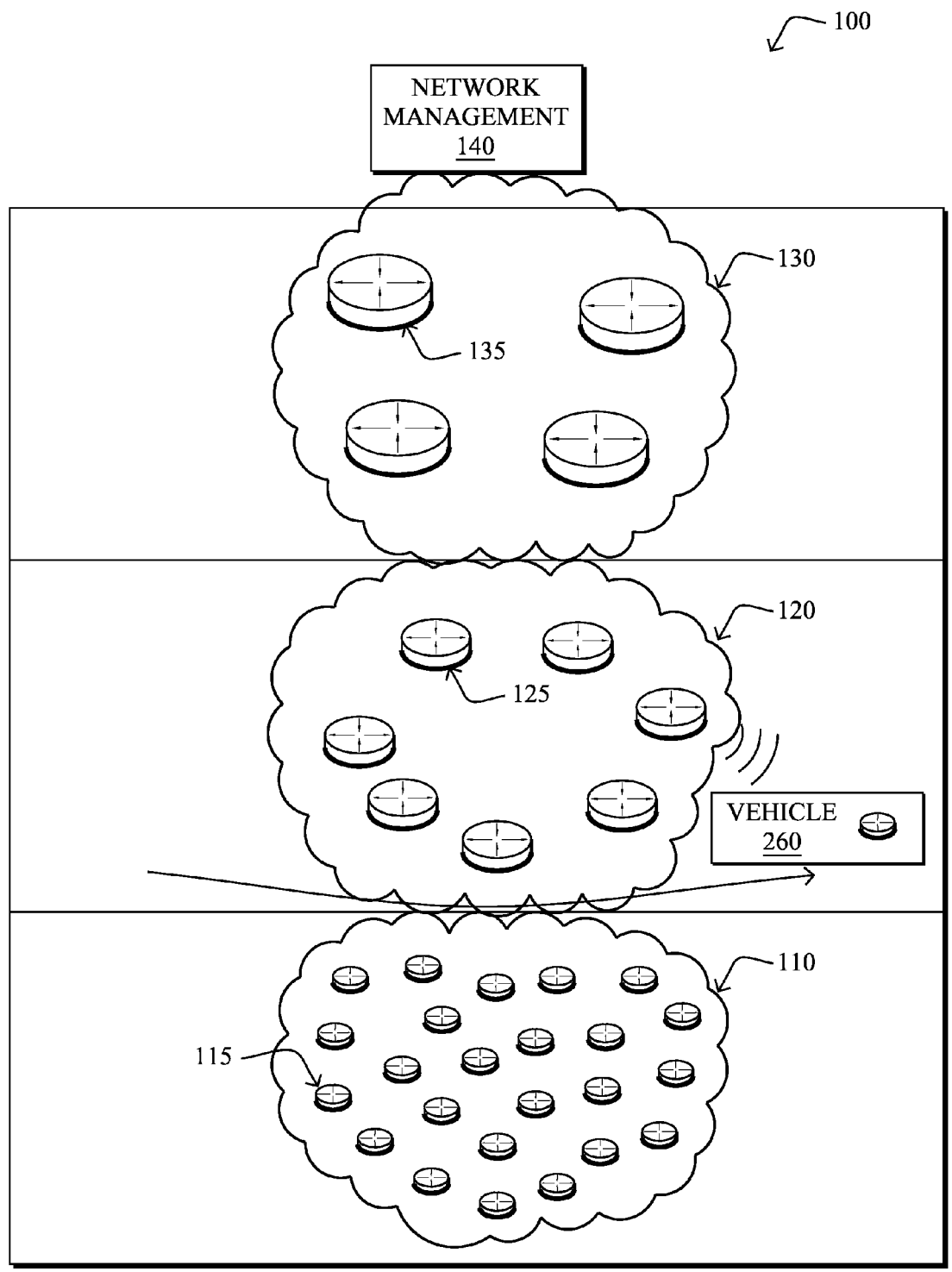

FIGS. 2A-2E illustrate example data flows within the computer network 100 of FIG. 1, such as in accordance with general IoT operation, and as may be used in accordance with the techniques described herein. For example, as shown in FIG. 2A, data 250 may be collected by various objects 115, and transmitted (e.g., as a packet 150) along the way to one or more field area network devices 125, and may be subjected to various degrees of aggregation, dropping, etc. along the way. The field area network devices 125 may then, as shown in FIG. 2B, apply further intelligence to the data 250, such as sensor applications, control, and correlation, and the processed data 255 may then be transmitted to the network management devices 140 as shown in FIG. 2C. Moreover, as a specific example of IoT operation to illustrate mobile objects, FIGS. 2D and 2E illustrate how an object 115, such as a vehicle 260 (generally, as a vehicle may actually comprise many network connected "objects"), may travel between IoT domains 110, and may be transferred between field area network devices 125 (such as field area routers or "FARs") or even field area networks 120 in general, depending upon proximity.

As noted above, over the past few years, the notion of smart connected objects such as sensors and actuators has opened the door to an endless number of applications such as smart grids, connected vehicles, smart cities, or smart healthcare to mention a very few. To that end, several "architectures" have been proposed, consisting of either connecting these devices through multi-protocol gateways or using IP (v6) end-to-end, in addition to various mixed options.

The idea of using multi-protocol gateways causes problems for a number of reasons, though are beneficial for protocol migration and limited in-time strategies offering a migration path from existing legacy protocols to IP. Some of the problems include operational complexity, lack of scalability (exponential number of protocol conversions), lack of QoS and routing consistency, single point of failure (the use of statefull multi-protocol gateways being a very costly option), security holes, etc.

Accordingly, a clear momentum in favor of IP end-to-end has emerged and a number of technologies have been developed and specified since 2007:

Lightweight operating systems running on low-power micro-controllers equipped with a few Kbytes of RAM and Flash and 8/16-bit micro-controllers; and Optimized IPv6 stacks and the emergence of new low-power PHY/MAC technologies (e.g., IEEE 802.15.4, low-power Wifi, P1901.2, PRIME, HP GreenPHY, etc.).

After careful analysis of the IP protocol suite, it was recognized that new IP protocols were required for these highly constrained and harsh environments. Some key is examples include:

1) 6LoWPAN: an adaptation layer handling fragmentation for low MTU links in addition to header compression;
2) RPL: a new routing protocol for LLNs;
3) CoAP: a lightweight resource management protocol designed to run on low-power end devices, significantly lighter than SNMP; and
4) Various optimization functions hosted at the link layer (e.g., frequency hopping for 15.4 g, PLC (P1901.2), etc.).

So far, the typical strategy consisted of implementing sophisticated networking protocols on constrained devices, responsible of handling QoS, routing, management, traffic engineering, sensing, algorithms for traffic reduction in the LLN, sophisticated strategies to increase channel capacity on low-bandwidth links, self-healing techniques for fast failure restoration in addition to constrained-routing, call admission control (CAC) and back-pressure mechanisms, etc. In other words, the goal has been to make the Internet of Things (IoT) as smart as possible, still while bounding the required resources at the edge the IoT (LLN).

Figure 3:
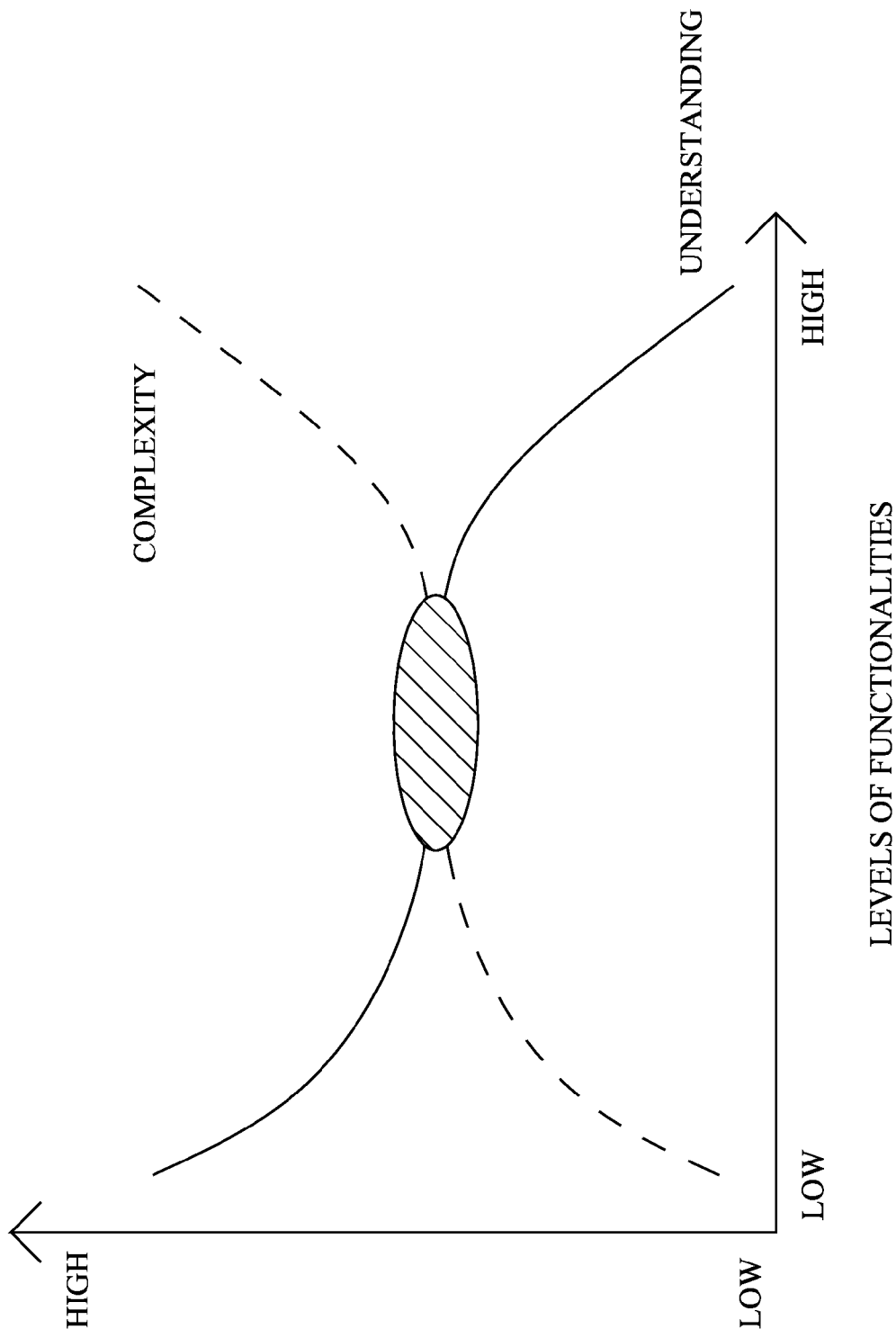
FIG. 3 illustrates an example trade-off between functionality and scalability in complex systems.

There is, however, a delicate trade-off between functionality and scalability in complex systems. That is, in many areas, one can obverse the phenomena shown in FIG. 3. As functionalities are added to devices, the complexity of the overall system combining all features (also simply referred to as "the network") increases to a point where incremental cost is acceptable before hitting an inflection point, at which time the overall understanding and scalability of that system drops dramatically. Although it is quite challenging to model mathematically such models with stochastic Petri networks or Markov chains, such an empirical analysis is mostly driven by years of experience designing and operating complex systems. Note that although scalability is a multi-polynomial function varying according to a number of factors, the weight of the "understanding" factor is undoubtedly large; in many circumstances, technologies have not been adopted in the field, not because they were intrinsically non-scalable from a is technological standpoint but because understanding the overall system was too costly in light of the added value for the end-user. For example, from a purely technological standpoint, even though certain systems can be understood, as the level of functionality increases the number of pathological non-understood cases also grows extremely rapidly.

After a few years of deep technical investigations, the overall complexity to be supported by smart objects does not grow linearly with the size of these networks and the number of supported features, but rather it grows exponentially, causing the scalability of the overall system itself to collapse. In the case of the IoT, we can expect an amplification of this phenomena for two reasons: (1) The scale of such network largely exceeds the largest known networks so far with potentially millions of devices; and (2) unexpectedly, the design of lightweight protocols (with a small footprint in terms of memory and bandwidth usage) requires quite sophisticated techniques with unknown behavioral patterns leading to added complexity in this part of the network, also known as the LLN (Low-power and Lossy Networks) or IP Smart Object Networks.

An objective of the illustrative network architecture described herein is to rethink the current model consisting of adding distributed intelligence of end devices and instead to limit the intelligence to the minimum required to provide secured connectivity. As described below, intermediate agents hosted on edge devices of the Field Area Network (e.g. routers) referred herein to as edge routers are introduced that assist these end devices in a number of decision making processes (QoS, network management, traffic engineering, etc.) and closely interact with central intelligence (hosted or more capable computers, e.g., in a data center) in order to make appropriate decisions, for instance, thanks to learning machines fed by traffic observation (e.g., deep packet inspection), a set of objectives (e.g., Service Level Agreements or SLAs), performance monitoring, analysis of behavioral patterns and network dynamics (e.g., to trade-off between optimality and stability), etc.

In particular, the illustrative architecture address switching intelligence and network control to the router edge boundary. As pointed out above, it is worth thinking of a radically new networking model for the Internet of Things (IoT), leading to a radical shift in terms of networking in a number of areas such as routing, self-healing techniques, QoS, CAC, NMS, reliability or security. According to the embodiments described below, the techniques herein generally consist of moving the networking intelligence at the second-tier of the network, on routers located at the fringe of the LLN (sometimes referred to as LBRs: LLN Border Routers) where resources can be considered as "non-limited" by contrast with devices (sensors/actuators/tags) in the LLNs. The main principle lies into the ability for the LBR and other components (applications running on routers, out-of-band routers/servers, etc.) to host functions where the output of which is then provided to Minimalistic Connected Objects or "MCOs" (which may also be referred to as "dumb connected objects or "DCOs" as contrasted to "smart objects").

In this illustrative architectural model, sensors/actuators purposefully become IPv6 "minimalistic connected objects" as opposed to smart objects (the trend the whole industry has been promoting for the last decade).

As rationale, one primary technological reason lies in the ability to scale networks to a size an order of magnitude larger than the current Internet. Simple math shows that extremely large-scale LLNs imply very advanced technologies (not previously specified and/or known) in order to effectively manage these networks. It thus becomes important to note that such networks are to be autonomic, self-configured, and embedded with local intelligence to support self-healing technologies and auto-configuration, and capable of performing local troubleshooting. Breaking large domains into smaller ones helps to reduce the overall complexity, but only as a temporary measure.

By adopting a radically different strategy consisting of making these devices "merely connected" as opposed to "smart," the architecture described herein will enable a large eco-system, enable connectivity on extremely constrained devices (including energy scavenger enabled devices), and the network will be "fed" with valuable data, thus increasing the rationale for the network to host in-bound intelligence, making it the platform of the future.

In particular, a radically different architecture may be used for the Internet of Things (IoT)/LLNs whereby smart objects are replaced by Minimalistic Connected Objects (MCOs) limited to providing basic secure connectivity to an LBR, at the fringe of "classic IP networks" connecting LLNs. LBRs illustratively host Distributed Intelligence Agents (DIAs), which are software/hardware modules fed by a number of inputs such as, e.g., traffic flow observation using deep packet inspection, SLA requirements specified by the user and provided by a Central Intelligence Controller (CIC). DIAs may also host a learning machine observing the flows and also the network dynamics and behavior trends, such that the DIA may further perform a number of tasks interacting with MCOs to activate when/where/if the required networking features such as network management, routing, quality of service (QoS), call admission control (CAC), etc. in the network.

Figure 4:
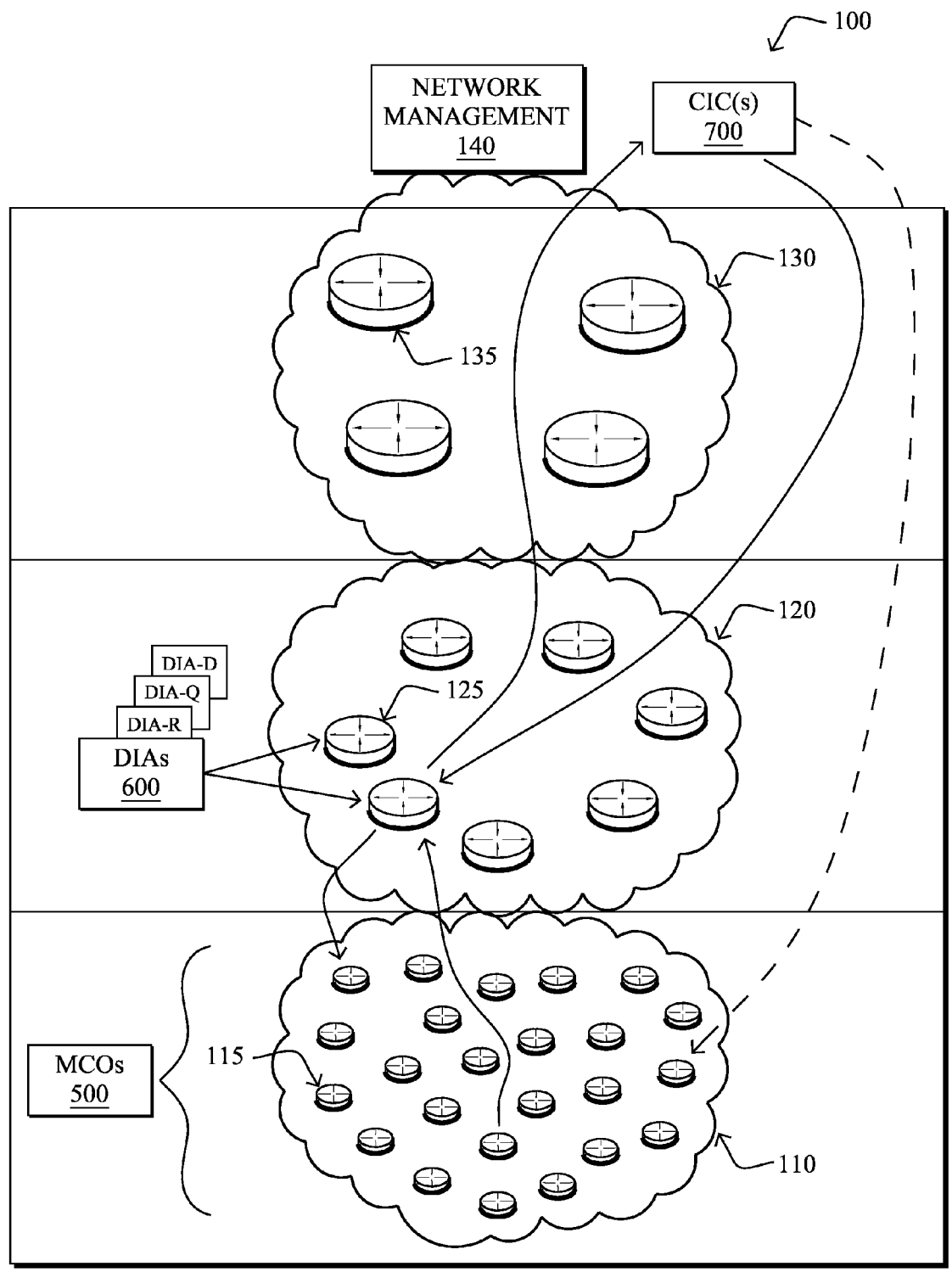
FIG. 4 illustrates an example view of the computer network in accordance with the architecture described herein for minimalistic connected objects (MCOs)

That is, an illustrative network architecture, as shown in FIG. 4, comprises one or more minimalistic connected objects (MCOs) 500, one or more distributed intelligence agents (DIAs) 600, and one or more central intelligence controllers (CICs) 700. Specifically, each MCO generally has limited intelligence sufficient to perform its respective designated task, securely join a computer network, and provide nominal state information, where the MCOs are not configured to perform complex application-specific data processing and complex networking tasks, such as making quality of service (QoS) decisions, participating in call admission control (CAC) operations, providing traffic engineering (TE) services, executing sophisticated reliability protocols, or extrapolating network management information, which contrasts with current IoT architectures. Also, the DIAs are configured to provide an edge to the computer network for the MCOs, and are responsible for intelligent networking management for the MCOs and for performing complex application-specific data processing for the MCOs. Lastly, the CICs operate within the computer network and are in communication with the DIAs to perform complex tasks for overarching control of MCO and DIA operation, and are also configured to provide one or more interfaces to receive a set of user-defined rules for the MCO and DIA operation.

Illustratively, the techniques described herein with respect to the illustrative architecture may be performed by hardware, software, and/or firmware, such as in accordance with respective processes specific to each type of device (MCO, DIA, CIC), which may contain computer executable instructions executed by a processor to perform functions relating to the novel techniques described herein, e.g., in conjunction with other processes executing on the respective devices. For example, the techniques herein may be treated as extensions to conventional protocols, such as various routing, communication, and/or management protocols, and as such, may be processed by similar components understood in the art that execute those types of protocols, accordingly.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while certain processes may be shown separately, those skilled in the art will appreciate that processes may be routines or modules within other processes.

According to the illustrative architecture, as noted above, a Minimalistic Connected Object (MCO) 500 is an object (e.g., sensor, actuator, radio frequency identifier (RFID) tag, or simple degenerated router) with an extremely lightweight processing requirement due to low intelligence and decision-making. By contrast with the current "Smart Objects" approach, an MCO has just enough intelligence to join a network using a degenerated routing approach, in a secure fashion, and provides just enough state information to the DIA/CIC (described below) with regards to its functionalities, resources, and supported capability. The MCOs generally perform no (self-directed) QoS or any form of CAC, TE, sophisticated reliability features, network management information (e.g., network statistics), and no application-specific data processing, since these functions are now hosted on the DIA 600, as described below.

Figure 5:
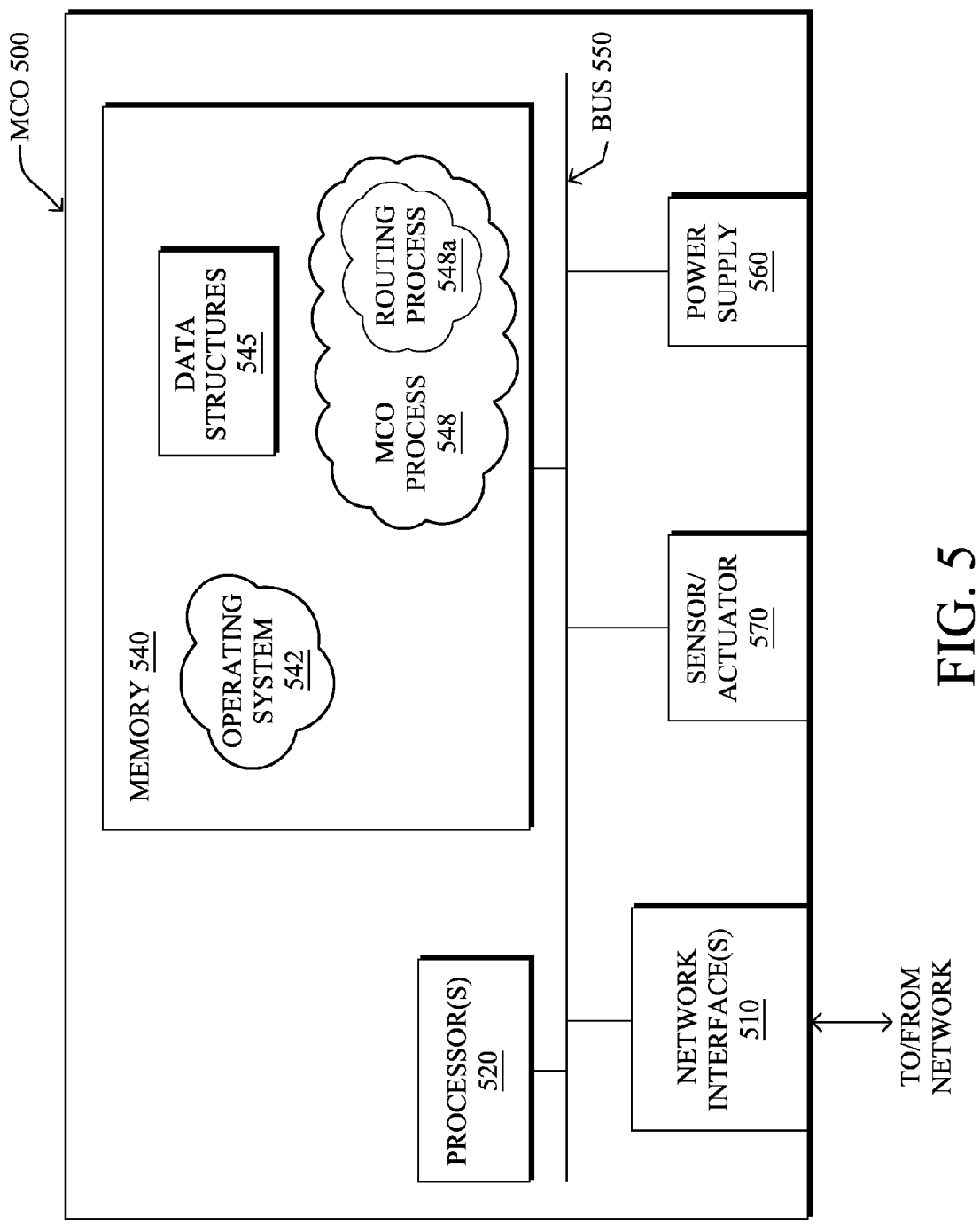
FIG. 5 illustrates an example of an MCO device.

FIG. 5 is a schematic block diagram of an example device 500 that may be used with one or more embodiments described herein as an MCO. The device may comprise one or more network interfaces 510 (e.g., wired, wireless, PLC, etc.), a processor 520, and a memory 540 interconnected by a system bus 550, as well as a power supply 560 (e.g., battery, plug-in, etc.). In addition, an MCO may generally comprise a sensor and/or actuator component 570.

The network interface(s) 510 contain the mechanical, electrical, and signaling circuitry for communicating data over links coupled to the network 100, i.e., in IoT domain 110. The network interfaces may be configured to transmit and/or receive data using a variety of different communication protocols. Note, further, that the nodes may have two different types of network connections 510, e.g., wireless and wired/physical connections, and that the view herein is merely for illustration. Also, while the network interface 510 is shown separately from power supply 560, for PLC the network interface 510 may communicate through the power supply 560, or may be an integral component of the power supply. In some specific configurations the PLC signal may be coupled to the power line feeding into the power supply.

The memory 540 comprises a plurality of storage locations that are addressable by the processor 520 and the network interfaces 510 for storing software programs and data structures associated with the embodiments described herein. Note that certain devices may have limited memory or no memory (e.g., no memory for storage other than for programs/processes operating on the device and associated caches). The processor 520 may comprise necessary elements or logic adapted to execute the software programs and manipulate the data structures 545. An operating system 542, portions of which are typically resident in memory 540 and executed by the processor, functionally organizes the device by, inter alia, invoking operations in support of software processes and/or services executing on the device. These software processes and/or services may illustratively comprise an "MCO process" 548, which may comprise one or more sub-processes, such as routing process/services 548a, as described herein.

As noted above, each MCO 500 has limited intelligence sufficient to perform its respective designated task (e.g., sense, actuate, route), securely join a computer network, and provide nominal state information. As such, MCO process 548 thus contains computer executable instructions executed by the processor 520 to perform functions related to such MCO actions, accordingly. As described herein, therefore, MCO process is not configured to perform complex application-specific data processing, make QoS decisions, participate in CAC operations, provide TE services, execute sophisticated reliability protocols, or extrapolate network management information. Routing process 548a is a generally degenerated routing process, and is kept simple enough to provide communication from the MCO 500 to other devices (other MCOs 500 or DIAs 600), accordingly. For example, topology information may be simply received from the DIAs as mentioned below, or else where MCOs are completely incapable of storing routing entries, routing process 548 may consist solely of providing mechanisms necessary for source routing techniques. That is, for source routing, other devices in the network can tell the less capable devices exactly where to send the packets, and the less capable devices simply forward the packets as directed. Alternatively, a minimalistic version of a routing protocol may be used, such as various simplified link-state protocols, e.g., a zeroconfiguration Open Shortest Path First or "zOSPF" as specified in an Internet Engineering Task Force (IETF) Internet Draft entitled "Autoconfiguration of routers using a link state routing protocol" <draft-dimitri-zospf-00> by Dimitrelis, at al. (October 2002 version), or else a simplified version of RPL, the full version of which is specified in the IETF Internet Draft entitled "RPL: IPv6 Routing Protocol for Low Power and Lossy Networks" <draft-ietf-roll-rpl-19> by Winter, et al. (Mar. 13, 2011 version).

According to the illustrative architecture described herein, another type of device, the Distributed Intelligence Agent (DIA) 600, consists of set of software/hardware modules hosted at the edge of the network (field area network 120), and are responsible for a number of networking and application oriented functionalities such as routing within the IoT/LLN 110, decisions on whether/if/how to dynamically activate QoS, CAC, Traffic Engineering, NMS-related processing (e.g., aggregation of networking statistics), application aware data processing (e.g., hosting an application that could interpret the data from the MCOs 500, potentially aggregate/drop data packets, trigger local actuation, etc.). The DIA 600 is hosted typically on a more capable device (e.g., an edge router) is equipped with Deep packet Inspection, Internet Protocol flow information export (IPFIX) operational capability, etc., as may be appreciated by those skilled in the art.

Figure 6:
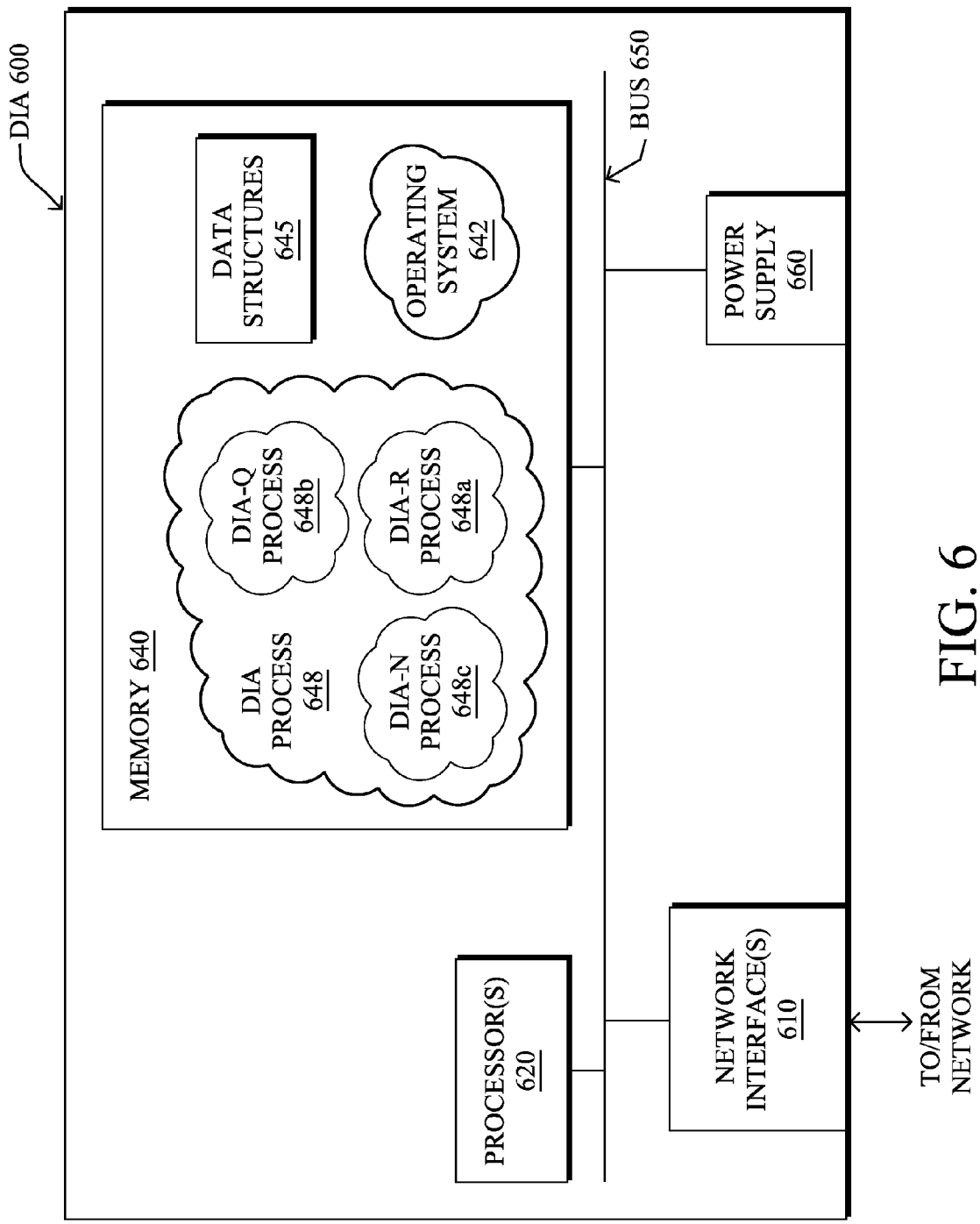
FIG. 6 illustrates an example of a distributed intelligence agent (DIA) device.

FIG. 6 is a schematic block diagram of an example device 600 that may be used with one or more embodiments described herein as a DIA. Similar to device 500, the DIA device 600 may comprise one or more network interfaces 610, at least one processor 620, and a memory 640 interconnected by a system bus 650, as well as a power supply 660 (e.g., plug-in). Generally, DIA device 600 is more capable than the limited MCO devices 500, and as such, may have greater processing capability, greater memory, etc.

Within the memory 640, an operating system 642 functionally organizes the device by, inter alia, invoking operations in support of software processes and/or services executing on the device, such as a "DIA process" 648, which may comprise one or more sub-processes, such as "DIA-R" process 648a, "DIA-Q" process 648b, "DIA-N" process 648c, etc., as described herein. That is, DIAs may be made of a set of intelligence modules each responsible for specific tasks: DIA-N (NMS) 648c, DIA-Q (QoS) 64ab, DIA-R (Routing) 648a, etc., in addition to application-related features (not related to the networking intelligence itself). Further, memory 640 may also be used to store one or more data structures 645, accordingly.

As noted above, each DIA 600 is configured to provide an edge to the computer network for the MCOs, and is responsible for intelligent networking management for the MCOs and for performing complex application-specific data processing for the MCOs. As such, DIA process 648 contains computer executable instructions executed by the processor 620 to perform functions related to such DIA actions, accordingly. As described herein, therefore, DIA process 648 is configured to perform complex application-specific data processing, such as interpreting data from the MCOs, aggregating data from the MCOs, dropping data from the MCOs, and triggering local actuation at the MCOs, as mentioned above. In addition, the DIA process 248 is further responsible for making QoS decisions (DIA-Q process 648b) for the MCOs, participating in CAC operations for the MCOs, providing TE services for the MCOs, and extrapolating network management information (DIA-N process 648c) for the MCOs, etc. Routing is process (DIA-R) 648a contains computer executable instructions executed by the processor 620 to perform functions provided by one or more routing protocols, such as proactive or reactive routing protocols as will be understood by those skilled in the art. These functions may, on capable devices, be configured to manage a routing/forwarding table (a data structure 645) containing, e.g., data used to make routing/forwarding decisions.

Notably, DIAs 600 heavily rely on state reports provided by MCOs, traffic observation using deep packet inspections and IPFIX, but also closely interact with the CIC(s) 700 in order to determine the service level agreement and/or performance monitoring so as to determine whether network performances are aligned with the objectives (e.g., where performance results reports are provided by the DIA-N). In order to accomplish this, the various DIA processes 248 (modules 248a-c ... ) may interact with each other: for example DIA-R (routing) may interact with the DIA-Q (QoS) so as to determine the consequences of a routing topology change on Quality of Service. Note that such collaboration is now possible, which is not the case with the current fully distributed models. That is, DIA 600 in general are intelligent modules in charge of performing tasks of various nature such as computing routing topologies, determining when/where/whether activating QoS in the network, performing local tasks related to NMS (instead of adopting a peer-to-peer network management function between the NMS and devices as in today's models), determining how to perform traffic engineering, etc. (Notably, the specifics of these features/algorithms and related protocols may be specified in detail elsewhere, and such specifics lie outside the scope of the present disclosure.)

Output decisions from the DIAs 600 result in sending messages (e.g., unicast or more rarely multicast messages) to MCOs 500 requesting behavioral changes, such as changes to forwarding decisions, activation of a QoS feature such as marking packets or applying priority to packets, activation and/or management of data generation (e.g., starting, stopping, and/or timing the sending of sensed data, such as if the sensed data has been determined as incorrect or non-coherent, or redundant, or unchanging, etc.). In addition, DIAs 600 may request the CIC(s) 700 to perform certain corrective actions, and CIC(s) may interact directly with an MCO 500, for example, in an attempt to download a new software/firmware upgrade on a dysfunctional device.

According to the illustrative architecture described herein, the final defined type of device, the Central Intelligence Controller (CIC) 700, is used to host more complex tasks for controlling the IoT domain 110, but also for receiving a set of rules defined by an end-user (e.g., specification of service level agreements (SLAs), levels of security, tasks for performance monitoring, etc.). The CIC(s) will have direct communication with the DIAs 600 that would make decisions and in turn communicate with MCOs, though in some cases the CIC may directly interact with MCOs 500.

Figure 7:
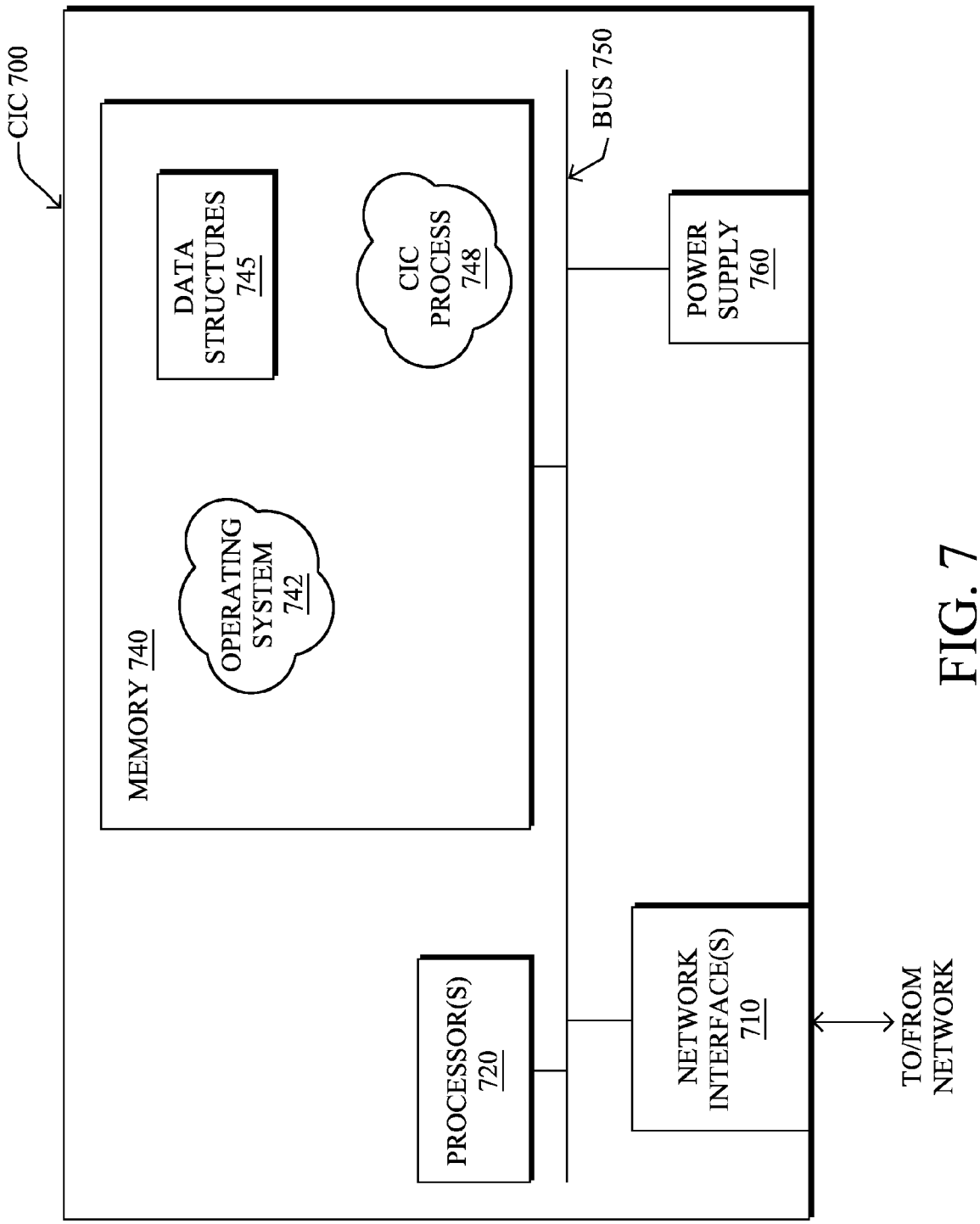
FIG. 7 illustrates an example of a central intelligence controller (CIA) device.

FIG. 7 is a schematic block diagram of an example device 700 that may be used with one or more embodiments described herein as a CIC. Similar to device 600, the CIC device 700 may comprise one or more network interfaces 710, at least one processor 720, and a memory 740 interconnected by a system bus 750, as well as a power supply 760 (e.g., plug-in). Within the memory 740 (which may store data structures 745), an operating system 742 functionally organizes the device by, inter alia, invoking operations in support of software processes and/or services executing on the device, such as a "CIC process" 748, as described herein.

In particular, as noted above, the CIC(s) 700 is(/are) configured to perform complex tasks for overarching control of MCO and DIA operation and also configured to provide one or more interfaces to receive a set of user-defined rules for the MCO and DIA operation. As such, CIC process 748 contains computer executable instructions executed by the processor 720 to perform functions related to such CIC actions, accordingly. As described herein, therefore, CIC process 748 is configured to perform complex tasks for overarching control of MCO and DIA operation performed by the CICs, such as security operations, performance monitoring, and SLA management, etc. In addition, as mentioned above, the CIC process 748 may also be configured for receiving instructions from the DIAs, and to correspondingly update MCO operation (e.g., via the DIAs or directly to the MCOs).

Such an architecture as described above specifies a strong paradigm shift from is conventional computer architectures. For example, in contrast with current models, QoS is activated on each node regardless of traffic observation and SLAs, whereas in this model an external node (hosting the DIA) determines if/when/whether QoS must be activated based on traffic observation and SLAs provided by the CIC. In today's network, routing is either fully centralized (e.g., in most optical/SDH networks) or distributed. In the architecture as described herein, however, the role of the LBR (DIA 600) is to iteratively improve and/or build the routing topology if/when/where required. The NMS paradigm is also changed: instead of a peer-to-peer model between an NMS and device, intermediate intelligence is added into the network, thus performing a number of NMS tasks at the DIAs, accordingly.

Assisted Intelligent Routing

As noted above, large-scale IP smart object networks pose a number of technical challenges. For instance, the degree of density of such networks (such as Smart Grid networks with a large number of sensors and actuators, smart cities, or advanced metering infrastructure or "AMI" networks) may be extremely high: it is not rare for each node to see several hundreds of neighbors. This is particularly problematic for LLNs, where constrained links can wreak havoc on data transmission.

One main issue with current existing models lies in the complexity of the overall architecture on constrained devices. For instance, one of the core aspects of RPL lies in the use of an Objective Function (OF) configured on the DAG Root that determines the rules according how nodes join the DAG: the OF specifies the list of metrics and constraints used to build the DAG in addition to a number of rules and objectives. A typical OF in Smart Metering applications may be: "find the shortest path based on the reliability metric (thus the most reliable path), while avoiding battery operated nodes." A typical OF in substation automation applications may be "find the shortest path based on the delay metric (shortest delay) while using encrypted links."

Other aspects of RPL (or other protocols) are also relatively complex, which though certainly very much appropriate to routing in existing networks comprising thousands of nodes, the sophistication (a number of available parameters, tuning, optional is building blocks) may be difficult to handle within a constrained network. For example, current estimates show that RPL would require a few Kbytes of RAM for state maintenance and slightly more memory in terms of Flash. Unfortunately, the level of complexity inherent to the challenges of routing in LLN using a distributed routing approach grows rapidly with the number of nodes in the network. This is particularly problematic within the network architecture described above, where the intention is to minimize the amount of processing and storage necessary on MCOs, not to mention the difficulty of troubleshooting distributed routing decisions at a large scale. At the same time, however, it is beneficial to maintain the sophistication of such complex routing protocols, as they have been developed over the years to make routing more efficient, more dynamic, and more intelligent.

According to the novel techniques herein, therefore, a routing approach is described for the Internet of Things consisting of using an iterative and conditional algorithm hosted on an edge router (e.g., DIA 600) at the fringe of the IoT/LLN, that collects network states, makes use of an number of inputs (e.g., SLAs, routing states, rules of various nature) so as to determine whether any routing modifications should be performed on the current routing topology instance. Thus, nodes (e.g., MCOs 500) are able to make use of simplified distributed routing procedures, and a routing engine (e.g., DIA) iteratively improves the routing topology only when required according to various inputs, leading to a novel distributed/semi-centralized routing approach that is particularly well-suited to large scale routing in the Internet of Things.

Specifically, according to one or more embodiments of the disclosure as described in detail below, a distributed intelligence agent (DIA) collects local state information from a plurality of minimalistic connected objects (MCOs) in a computer network, the local state information for each MCO comprising a corresponding neighbor list and a selected next-hop for the respective MCO, where one or more of the MCOs are configured to select their next-hop without any self-optimization. The DIA may then analyze a current routing topology, which is the combined result of the selected next-hops, in comparison to a computed optimal routing topology to determine whether to is optimize the current routing topology. In response to determining that the current routing topology should be optimized, the DIA may transmit a unicast routing instruction to one or more individual MCOs to instruct those individual MCOs how to optimize the current routing topology, accordingly.

Illustratively, the techniques described herein with relation to the DIA (or LBR) actions may be performed by hardware, software, and/or firmware, such as in accordance with the DIA process 648, or more particularly, the DIA-R (routing) process 648a, which may contain computer executable instructions executed by the processor 620 to perform functions relating to the novel techniques described herein. Alternatively, with relation to the MCO (or LLN device) actions may be performed by hardware, software, and/or firmware, such as in accordance with the MCO process 548, or more particularly, routing process 548a, which may contain computer executable instructions executed by the processor 520 to also perform functions relating to the novel techniques described herein.

Figure 8:
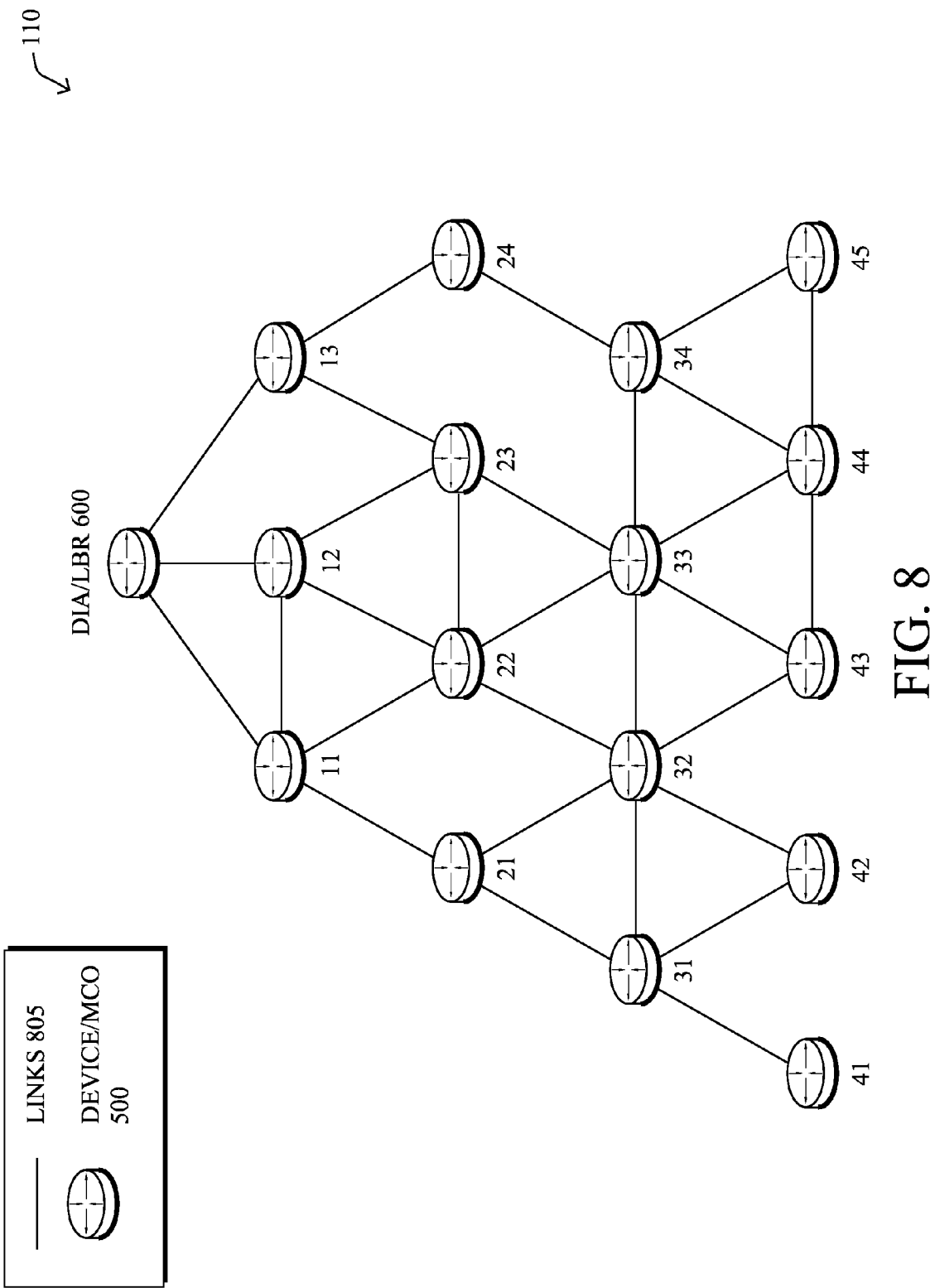
FIG. 8 illustrates an example network domain (LLN or IoT domain)

In addition, as an example representation of an LLN or IoT domain 110 of FIG. 1, FIG. 8 is a schematic block diagram of an example computer network 800 illustratively comprising nodes/devices (e.g., labeled as shown, "LBR/root," "11," "12," ... "45,") interconnected by various methods of communication. For instance, the LBR/root device may be configured as a DIA 600, while the remaining devices 11-45 may be MCOs 500, according to the illustrative architecture described above.

Operationally, the techniques herein are generally based on four major components, as described in greater detail below:
1) A degenerated version of a sophisticated routing protocol, such as RPL, consisting of selecting the very minimum subset of required functionalities to build a Minimal Routing Topology (MRT), where an MRT is defined as the most simplified form of routing topology without requiring any form of optimization;
2) Collection of local states by the DIA-R provided by each individual node;
3) Routing analysis of the MRT in light of an Optimal Routing Topology (ORT), required service level agreements (SLAs), along with other constraints so as to determine whether the MRT should be optimized; and
4) Sending unicast routing instructions to nodes according to the newly computed routing topology instance, "RT(i)." The techniques are then iterative, returning to number 3).

==Building the MRT==

As noted above, the example RPL protocol provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 150, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements. Note that while the RPL protocol may define a complete set of functionalities, in order to maintain a simplified process on the MCOs, a reduced version of RPL may be used, e.g., a minimal subset of functionalities to create a routing topology, particularly as described in detail herein.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may be built (e.g., by routing process 548a) based on an Objective Function (OF), the role of which to specify rules on how to build the DAG (e.g. number of parents, backup parents, etc.). However, to keep the process simple, DAGs may be built by MCOs without the use of an Objective Function, and may instead use very basic next-hop selection algorithms, again, as particularly described herein.

According to this component of the techniques herein, therefore, the role of the MCOs 500 consists in building the initial MRT, Minimal Routing Topology. Illustratively, a very minimal subset of the RPL protocol is used to that end. Simplified Link Local multicast messages may be used to propagate DAG information, such as a RPL DODAG Information Object (DIO) that allows a node to discover a RPL Instance, learn its configuration parameters, select a DODAG parent set, and maintain the upward routing topology. The notion of an objective function is removed, however, along with all of the mechanisms responsible for local repair. DIS (DODAG Information Solicitation) messages, which are sent under specific circumstances for a node to request routing neighbor discovery are kept (although simplified, and without the use of filtering), while Destination Advertisement Object (DAO) messages used to report local routing adjacency and prefix information to provision downward routes are removed (alternatively, very simplified versions of the DAO may be used to advertise prefix reachability to the LBR). The simple notion of poisoning is kept as well as the loop detection process and the use of trickle timers (although modified as described below). New parent selection algorithms and decisions on DIO propagation are also changed as explained below.

Note that such changes are fairly dramatic and lead to a simplified Distance Vector routing topology formation through a distributed and proactive routing protocol. In other words, the MCOs participate in a build of a current routing topology without any self-optimization, where an initial instance of the current routing topology (e.g., the MRT) has loop prevention, but does not have an objective function, mechanisms for local repair, or propagating advertisement messages, as noted above.

Figure 9:
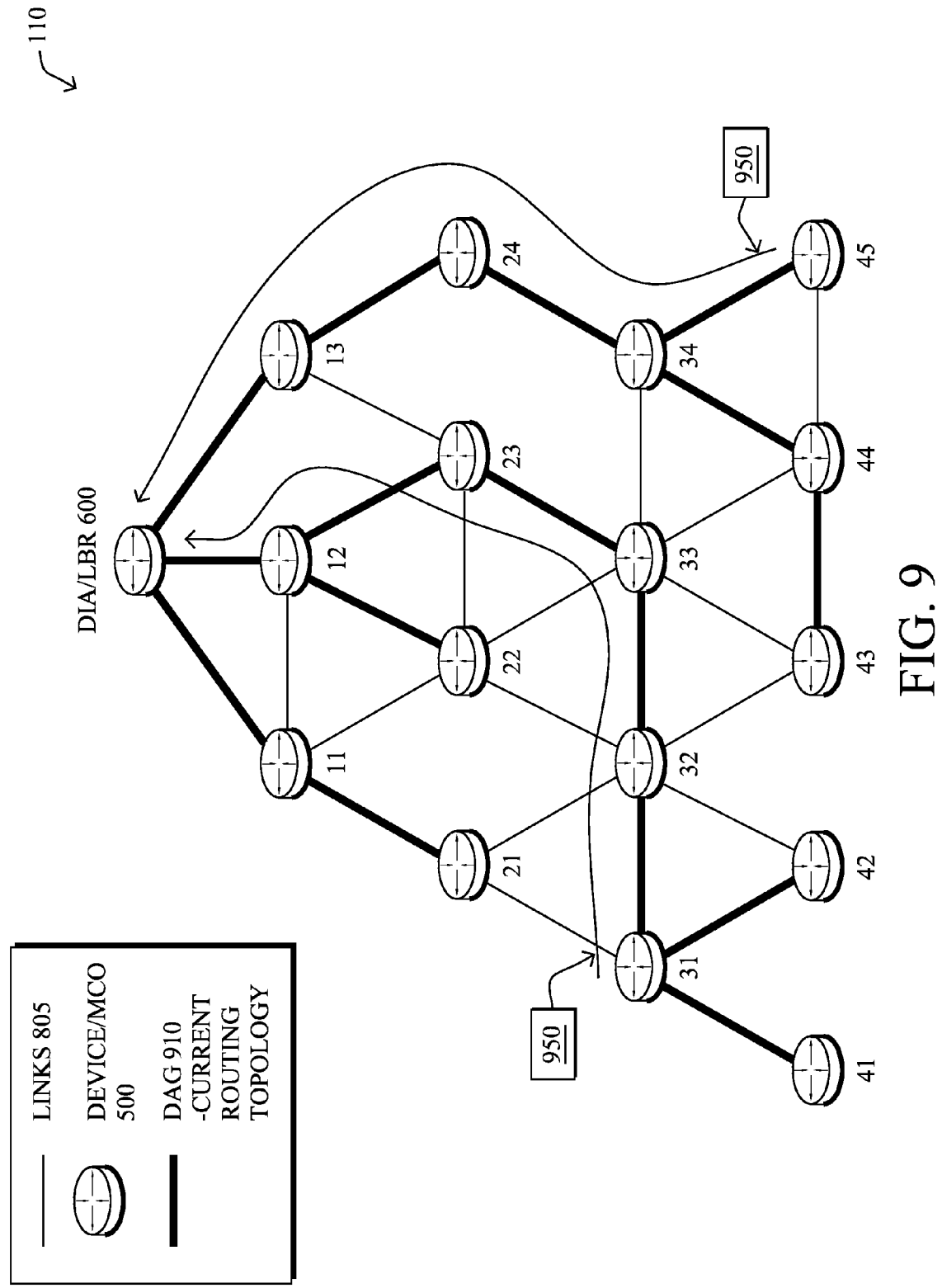
FIG. 9 illustrates an example minimal current routing topology (a directed acyclic graph (DAG)) within the particular network domain of FIG. 8.

FIG. 9 thus illustrates an example minimal current routing topology (a directed acyclic graph (DAG)) that may be created within the network domain of FIG. 8, e.g., through the techniques described above. For instance, certain links 805 may be selected for each node to communicate with a particular next-hop or "parent" (and thus, in the reverse, to communicate with a child, if one exists). These selected links form the DAG 910 (shown as bolded lines), which extends from the root node toward one or more leaf nodes (nodes without children). Traffic/packets 150 may then traverse the DAG 910 in either the upward direction toward the root or downward toward the leaf nodes. Note that the current (e.g., minimal) routing topology, DAG 910, is generally non-optimized, and while functional, may leave room for improvement, particularly as described herein.

==Collection of Local States by the DIA-R==

The MCOs 500 transmit local state information 950 to the corresponding DIA 600 (e.g., LBR), where the local state information comprises a corresponding neighbor list and a selected next-hop for the MCO for the current routing topology. That is, each node in the network shares its list of reachable neighbors, for example, through the use of IPv6 ND (Neighbor Discovery), where neighbors selected as next-hops are specifically flagged. Notably, for each element (neighbor) of the list, the reporting node/MCO may provide additional information, such as the local cost of the links (e.g., in terms of reliability, delays, etc.) depending on the cost that can be computed by the node. Note that it is expected to provide simple metrics in order to minimize the level of complexity on the node. For example, a metric such as the expected transmission count (ETX) can be reasonably easily obtained by the nodes thanks to the link layer (when ACK/NACK are in use) as well as the link-based received signal strength indication (RSSI) (or its equivalent measurement for PLC links).

Note that the neighbor list is not tied to the routing selection and lists all neighbors, potentially after filtering out nodes that are not potential candidates for routing (e.g., link is too weak, etc.). The neighbor list is provided by the nodes/MCOs to the DIA 600 (DIA-R 648*a*), which may be discovered thanks to a newly defined option carried within DHCP (dynamic host configuration protocol) messages and provided to the nodes (MCOs) during the bootstrapping process. Note that as described below, the local state information 950 may be shared whenever significant changes are observed (e.g., using hysteresis). Said differently, updated local state information 950 may be transmitted from the MCO to the DIA in response to the updated local state information being a significant change from the previously transmitted local state information.

==DIA-R Routing Analysis and Optimization==

Figure 10:
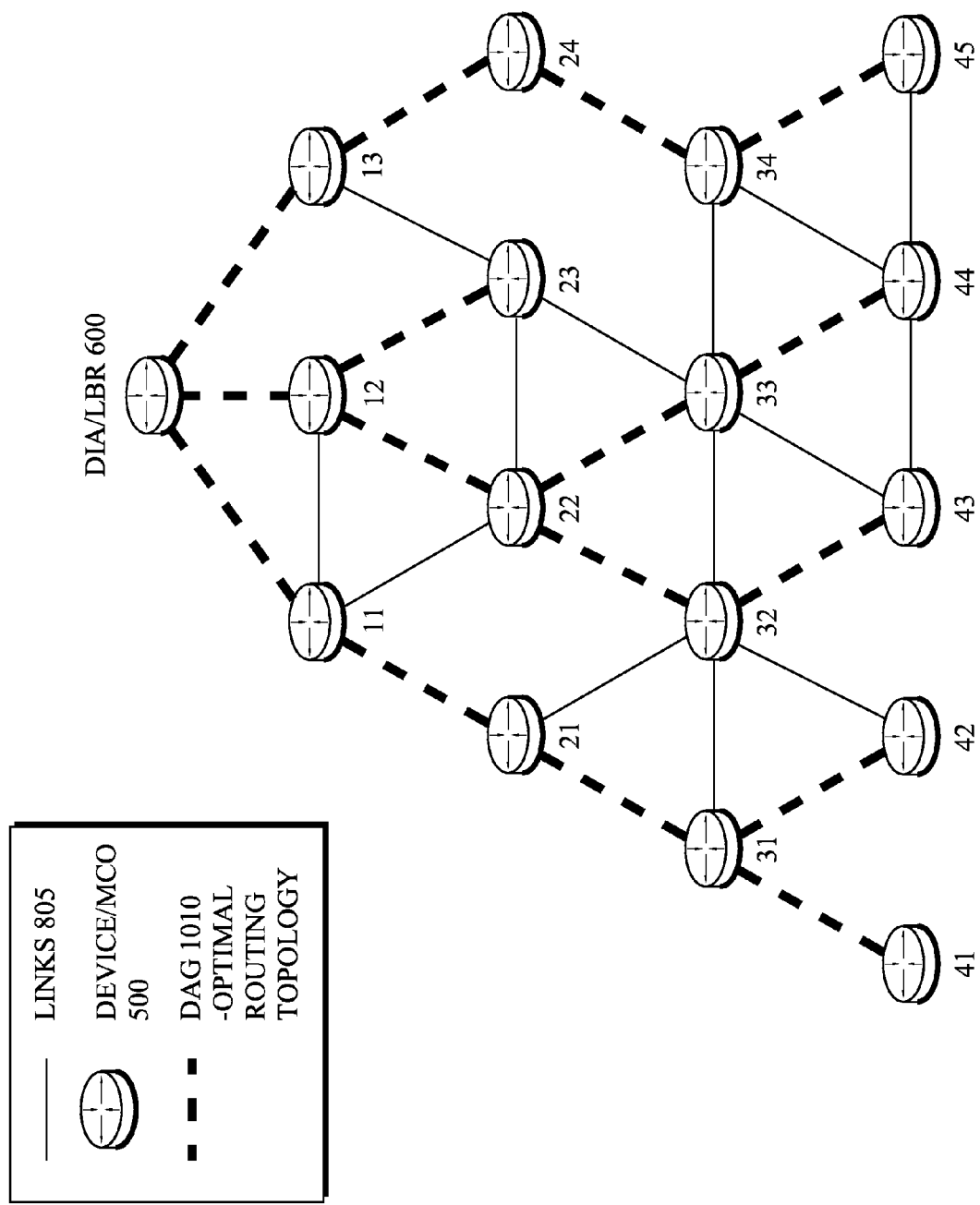
FIG. 10 illustrates an example optimal routing topology within the particular network domain of FIG. 8.

Once the neighbor list of each node in the network has been collected, the DIA-R 648*a* uses the collection of the list to form a network database (NDB). From this database, the DIA-R may compute an optimal routing topology using one or more sophisticated routing algorithms with full visibility of the network. For instance, FIG. 10 illustrates an example optimal routing topology (DAG 1010) within the particular network domain of FIG. 8. An illustrative shortest path first (SPF) Dijsktra algorithm (for example) may be used to compute the optimal routing topology, and may be based on one or more constraints, or else may be based on meeting one or more required service level agreements (SLAs).

The DIA analyzes the current routing topology 910, which is the combined result of the selected next-hops from information 950, in comparison to the computed optimal routing topology 1010 to determine whether to optimize the current routing topology. Various techniques and criteria can be used to compare routing topologies such as the difference in terms of total routing topology costs (sum of all paths), number of paths exceeding a pre-defined maximum path cost or maximum path cost difference, or any weighted polynomial function of the above. As referred to herein, "Delta" is the compared difference between the optimal routing topology and the current routing topology. Note that a second input for the DIA-R consists of gathering SLA requirements (e.g., by an NMS or CIC) about the flows in the network, such that the analysis may be based on a path within the current routing topology not meeting one or more required SLAs.

If Delta exceeds a pre-defined threshold and/or the DIA-R determines that the SLAs are no longer met (that cannot be fixed by enabling QoS), this is an indication of a non-desirable level of sub-optimality of the current routing topology, and the DIA-R enters into the iterative optimization mode. Well-known algorithms may be used to identify the main areas of sub-optimality in the current routing topology (using the network database). The DIA-R may thus send a newly defined message that contains a directive for the targeted node(s) to modify their routing table and consequently update the current routing topology. It is worth noting that the DIA-R may also take into account the number of changes required. For example, if by making two changes in the routing topology it improves Delta by 35%, and with ten changes it would improve it by 45%, the DIA-R may opt for the minimum number of changes as long as SLA are met.

Figure 11A:
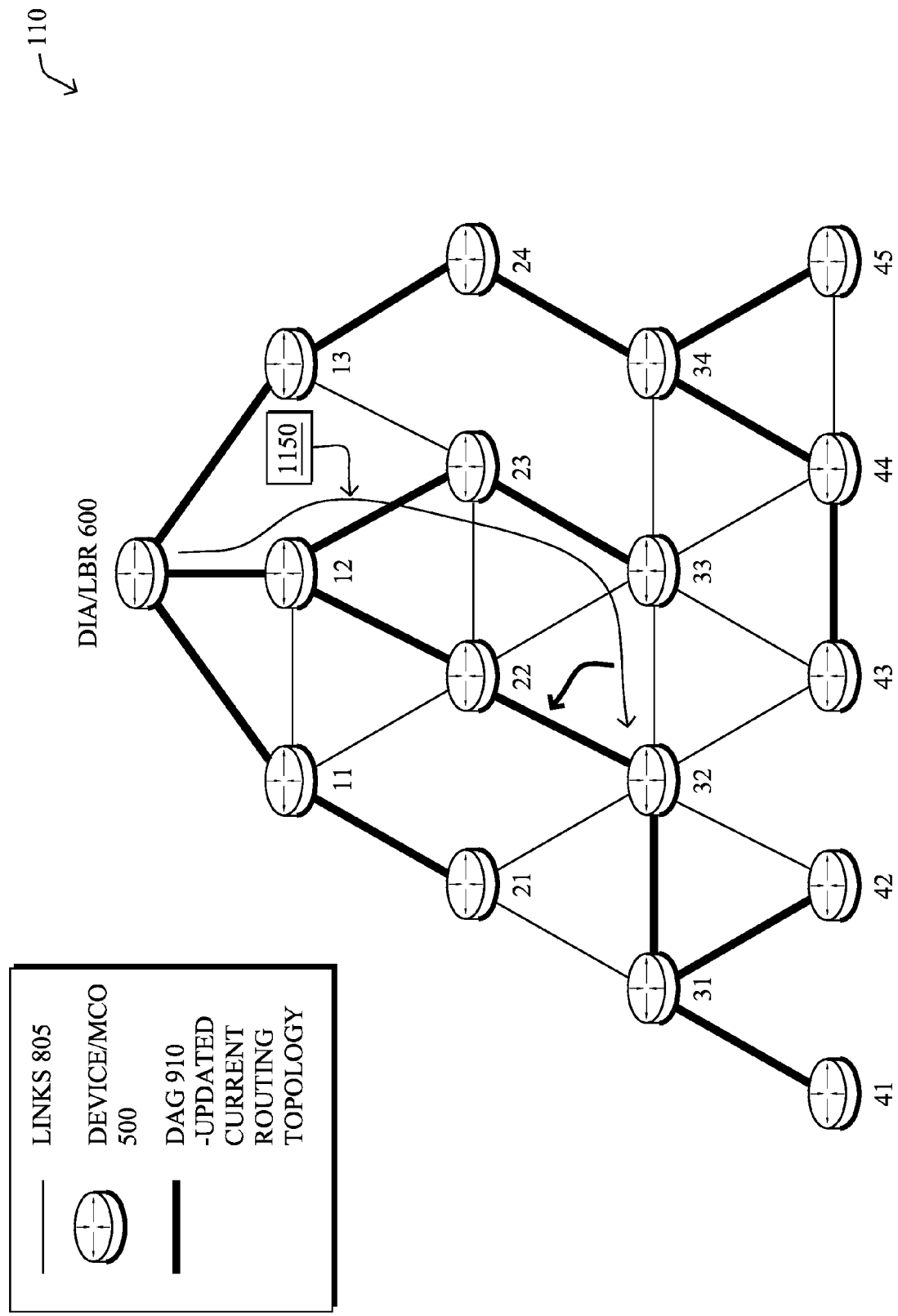

As shown in FIG. 11A, in response to determining that the current routing topology 910 (of FIG. 9) should be optimized, the DIA 600 (DIA-R 648*a*) transmits a unicast routing instruction 1150 to one or more individual MCOs to instruct those individual MCOs how to optimize the current routing topology, accordingly. For example, the transmitted routing instruction 1150 may comprise a new next-hop (parent) selection for the respective individual MCO. As shown, therefore, upon receiving the unicast routing instruction 1150 from the DIA, the MCO may re-select a next-hop (and optionally a back-up next hop) for an updated current routing topology according to the routing instruction, thus updating the current routing topology 910.

A timer may then be armed, after the expiration of which, Delta is re-computed by the DIA-R as the cost difference between the latest updated current routing topology 910 and the optimal routing topology 1010, along with the SLA requirements. If the condition is still not met, i.e., the current routing topology should be further improved, the optimization process is iteratively continued, otherwise the process stops. For example, FIG. 11B illustrates a further optimization iteration that may take place in the example topology 910. In particular, upon receiving updated local state information 950 from the MCOs, the DIA analyzes the corresponding updated current routing topology, and transmits additional unicast routing instructions 1150 in response to determining that the updated current routing topology should be further optimized. Note also, that in addition to updating the current routing topology 910, the DIA-R continues to update the network database, and computes the optimal routing topology 1010 so as to continuously is monitor the Delta in cost.

Figure 12:
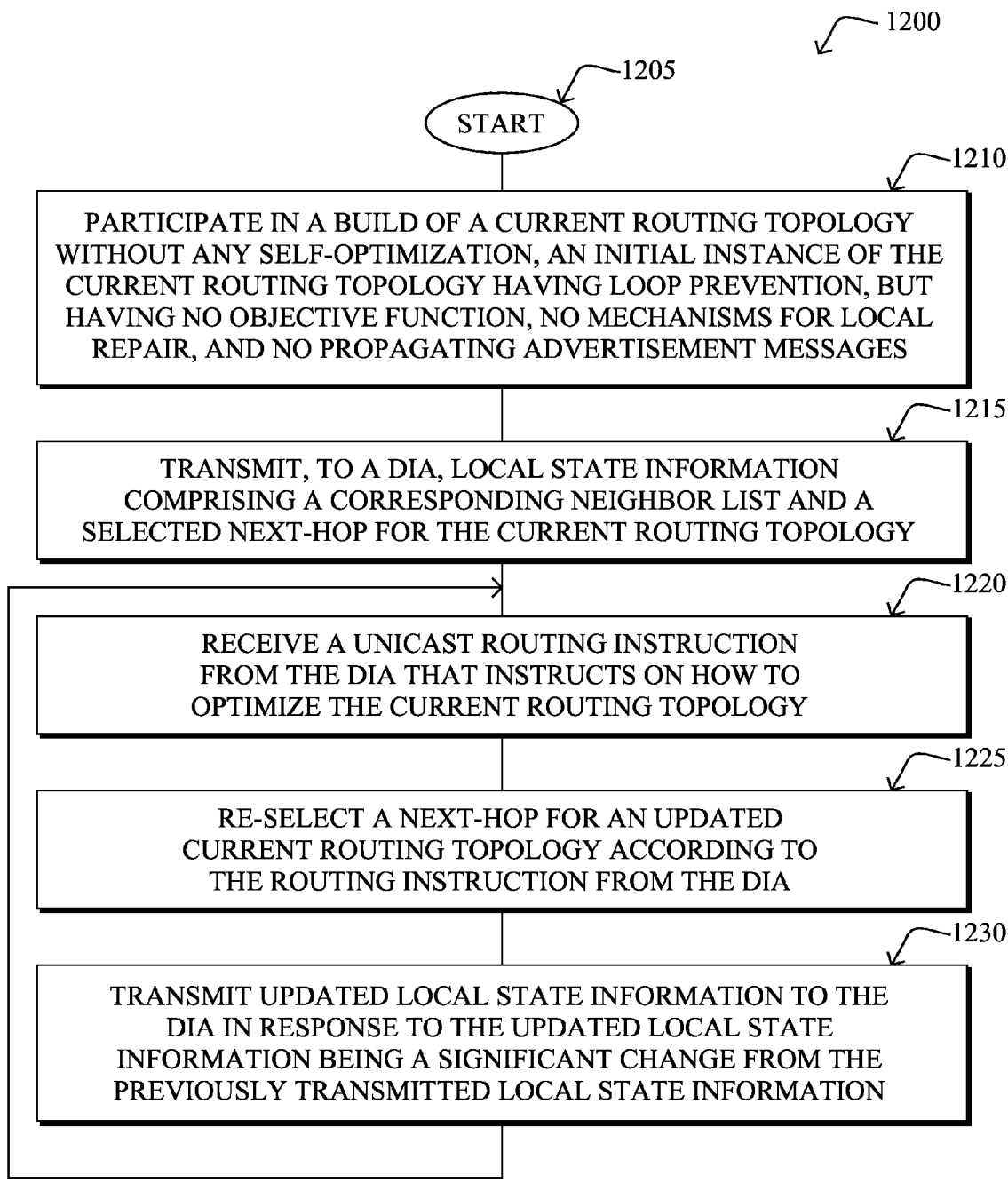
FIG. 12 illustrates an example simplified procedure for assisted intelligent routing, from the perspective of a minimalistic connected object (MCO)

FIG. 12 illustrates an example simplified procedure for assisted intelligent routing in accordance with one or more embodiments described herein, from the perspective of a minimalistic connected object (MCO). The procedure 1200 starts at step 1205, and continues to step 1210, where, as described in greater detail above, an MCO 500 participates in a build of a current routing topology (e.g., DAG 910) without any self-optimization, where an initial instance of the current routing topology, e.g., the minimal routing topology, generally has loop prevention, but has no objective function, no mechanisms for local repair, and no propagating advertisement messages.

Based on the current routing topology, in step 1215 the MCO transmits, to a DIA 600, local state information 950 comprising a corresponding neighbor list and a selected next-hop, accordingly. Subsequently, in the event that the current routing topology can and should be optimized at that particular MCO, then the particular MCO may receive in step 1220 a unicast routing instruction 1150 from the DIA that instructs on how to optimize the current routing topology. As such, in step 1225 the MCO may re-select a next-hop for an updated current routing topology according to the routing instruction from the DIA. Additionally, in step 1230 (which is shown taking place after step 1225, but may occur at any suitable moment during the process), the MCO may transmit updated local state information to the DIA in response to the updated local state information being a significant change from the previously transmitted local state information. The procedure 1200 may return to step 1220, where further instructions may be received to optimize the routing topology.

Figure 13:
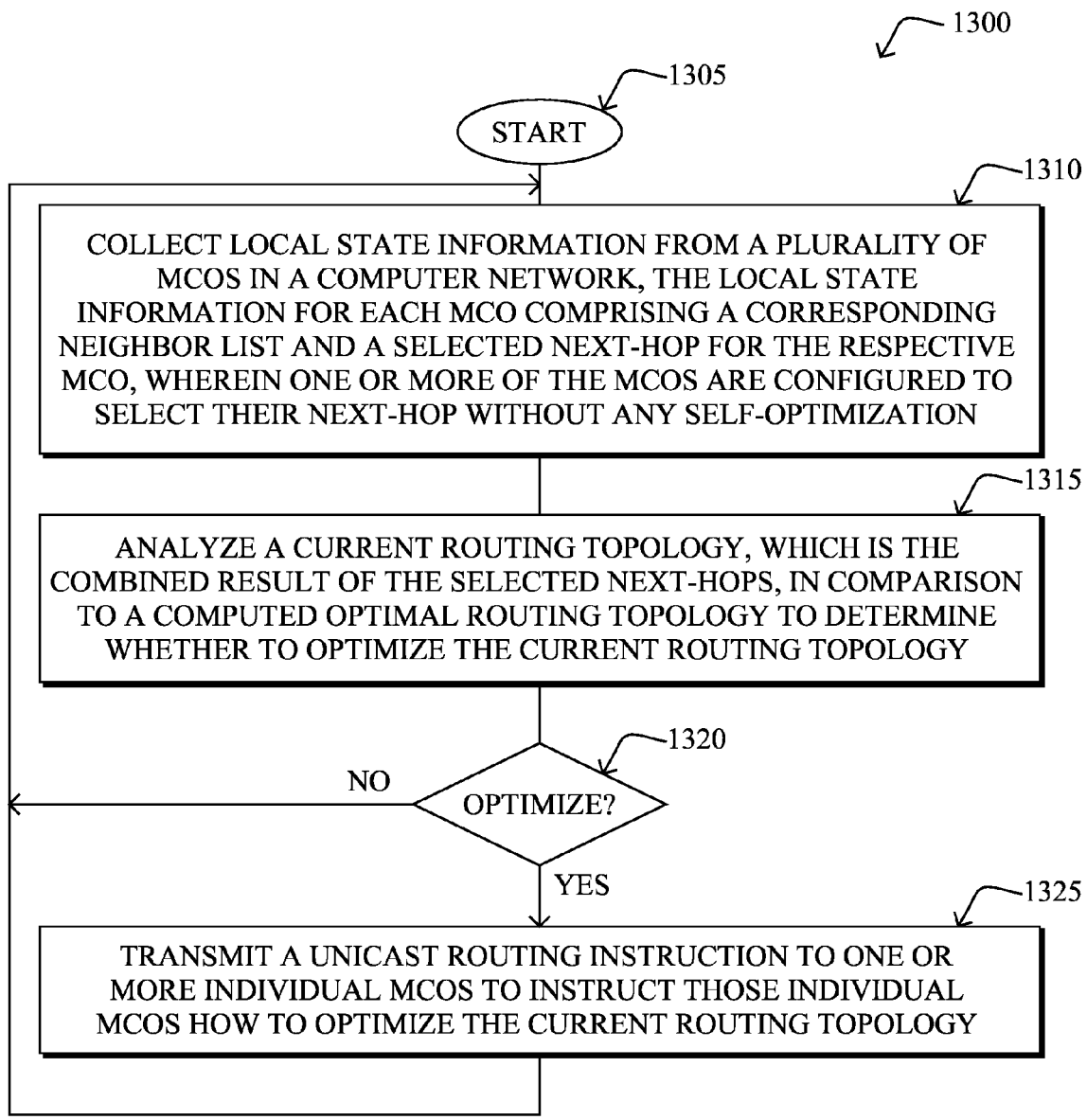
FIG. 13 illustrates another example simplified procedure for assisted intelligent routing, from the perspective of a distributed intelligence agent (DIA).

In addition, FIG. 13 illustrates another example simplified procedure for assisted intelligent routing in accordance with one or more embodiments described herein, from the perspective of a distributed intelligence agent (DIA). The procedure 1300 starts at step 1305, and continues to step 1310, where, as described in greater detail above, the DIA 600 (e.g., LBR) collects local state information 950 from a plurality of MCOs 500 in a computer network, the local state information for each MCO comprising, as mentioned above, a corresponding neighbor list and a selected next-hop for the respective MCO, is wherein one or more of the MCOs are configured to select their next-hop without any self-optimization. As such, in step 1315, the DIA may analyze a current routing topology 910, which is the combined result of the selected next-hops, in comparison to a computed optimal routing topology 1010 to determine whether to optimize the current routing topology. If it is decided in step 1320 that optimization can and should occur, then in step 1325 the DIA may transmit a unicast routing instruction 1150 to one or more individual MCOs to instruct those individual MCOs how to optimize the current routing topology, accordingly. The procedure 1300 then returns to step 1310, where based on updated local state information, further iterations of routing topology optimizations may correspondingly take place.

It should be noted that while certain steps within procedures 1200-1300 may be optional as described above, the steps shown in FIGS. 12-13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200-1300 are described separately, certain steps from each procedure may be incorporated into each other procedure, and the procedures are not meant to be mutually exclusive.

The novel techniques described herein, therefore, provide for assisted intelligent routing for LLNs, particularly where MCOs are used. In particular, the techniques herein specify a new approach consisting of building a de-generated DAG, requiring minimum distributed intelligence where nodes are assisted by an external routing agent (DIA-R) hosted on the LBR that only improves the Routing Topology (RT) when and if required. That is, with the above architecture, MCOs do not need to be configured with intelligent routing mechanisms, thus the techniques herein dramatically reduce the overall complexity on the MCOs, the configuration burden, and the number of tasks handled by the MCOs, thus saving energy, which is of the utmost importance in LLNs. For instance, the techniques herein provide a "good enough" routing topology, while dramatically reducing the level of complexity of distributed routing on MCOs, leading to a very high-scale routing approach for the Internet of Things and a much more efficient mechanism to is troubleshoot routing in large scale LLNs and the Internet of Things.

Note that the routing agent, e.g., the DIA (DIA-R), is not a Path Computation Element (PCE), as may be understood by those skilled in the art. In particular, a PCE is generally a routing engine that computes paths according to explicit requests sent by a Path Computation Client (PCC). As shown and described above, the DIA-R does not receive any such requests, but rather determines, according to routing conditions and rules or feed-back received by the CIC, whether or not the current routing topology should be improved, which is a radically different approach from the one supported by the PCE.

While there have been shown and described illustrative embodiments that provide for assisted intelligent routing for LLNs, particularly where MCOs are used, it is to be understood that various other adaptations and modifications may be made within the spirit and scope of the embodiments herein. For example, the embodiments have been shown and described herein with relation to the specific illustrative IoT architecture described above for use with MCOs. However, the embodiments in their broader sense are not as limited, and may, in fact, be used with other types of networks and/or protocols, such as LLNs in general (with relatively "smart" objects), or even in networks that are not particularly low-powered or lossy. Moreover, while the RPL protocol is shown as the intelligent routing protocol that is used in reduced form on the MCOs to create an MRT, other sophisticated routing protocols may be used in reduced form. In addition, while the CICs are shown as being separate from the DIAs, in certain embodiments it is possible that the CIC functionality (CIC process 748) may reside locally on one or more DIAs, i.e., the CIC and DIA are a single device configured with both CIC and DIA functionality. Thus (or separately), the DIA may also have an interface to receive user-defined rules and configuration.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method, comprising:
collecting, by a distributed intelligence agent (DIA), local state information from a plurality of minimalistic connected objects (MCOs) in a computer network, the local state information for each MCO comprising a corresponding neighbor list and a selected next-hop for the respective MCO, wherein one or more of the MCOs are configured to select their next-hop without any self-optimization;
analyzing, by the DIA, a current routing topology, which is the combined result of the selected next-hops, in comparison to a computed optimal routing topology to determine whether to optimize the current routing topology; and in response to determining that the current routing topology should be optimized, transmitting a unicast routing instruction from the DIA to one or more individual MCOs to instruct those individual MCOs how to optimize the current routing topology.

2. The method as in claim 1, further comprising:
receiving updated local state information from the MCOs at the DIA;
analyzing a corresponding updated current routing topology; and
transmitting additional unicast routing instructions in response to determining that the updated current routing topology should be further optimized.

3. The method as in claim 1, further comprising:
computing the optimal routing topology based on one or more constraints.

4. The method as in claim 1, further comprising:
computing the optimal routing topology based on meeting one or more required service level agreements (SLAs).

5. The method as in claim 1, wherein determining whether to optimize the current routing topology is based on at least one factor selected from a group consisting of: a total cost differential between the current routing topology and the optimized routing topology; a maximum path cost difference between the current routing topology and the optimized routing topology; a path within the current routing topology not meeting one or more required service level agreements (SLAs); and a number of changes required to optimize the current routing topology.

6. The method as in claim 1, wherein the transmitted routing instruction comprises a new next-hop selection for the respective individual MCO.

7. The method as in claim 1, wherein the local state information comprises at least one of local link cost, local link reliability, local link delay, local link expected transmission count (ETX), and a link-based received signal strength indication (RSSI).

8. An apparatus, comprising:
one or more network interfaces to communicate in a computer network;
a processor coupled to the network interfaces and adapted to execute one or more processes; and
a memory configured to store a process executable by the processor, the process when executed operable to:
collect local state information from a plurality of minimalistic connected objects (MCOs) in a computer network, the local state information for each MCO comprising a corresponding neighbor list and a selected next-hop for the respective MCO, wherein one or more of the MCOs are configured to select their next-hop without any self-optimization;
analyze a current routing topology, which is the combined result of the selected next-hops, in comparison to a computed optimal routing topology to determine whether to optimize the current routing topology; and
in response to determining that the current routing topology should be optimized, transmit a unicast routing instruction to one or more individual MCOs to instruct those individual MCOs how to optimize the current routing topology.

9. The apparatus as in claim 8, wherein the process when executed is further operable to:
receive updated local state information from the MCOs;
analyze a corresponding updated current routing topology; and
transmit additional unicast routing instructions in response to determining that the updated current routing topology should be further optimized.

10. A method, comprising:
participating, by a minimalistic connected object (MCO) with a plurality of MCOs in a computer network, in a build of a current routing topology without any self-optimization, an initial instance of the current routing topology having loop prevention, but having no objective function, no mechanisms for local repair, and no propagating advertisement messages;
transmitting, from the MCO to a distributed intelligence agent (DIA), local state information comprising a corresponding neighbor list and a selected next-hop for the MCO for the current routing topology;
receiving a unicast routing instruction from the DIA at the MCO that instructs the MCO how to optimize the current routing topology; and
re-selecting a next-hop for an updated current routing topology according to the routing instruction from the DIA.

11. The method as in claim 10, further comprising:
transmitting updated local state information from the MCO to the DIA in response to the updated local state information being a significant change from the previously transmitted local state information.

12. The method as in claim 10, wherein the local state information comprises at least one of local link cost, local link reliability, local link delay, local link expected transmission count (ETX), and a link-based received signal strength indication (RSSI).

13. An apparatus, comprising:
one or more network interfaces to communicate in a computer network;
a processor coupled to the network interfaces and adapted to execute one or more processes; and
a memory configured to store a process executable by the processor, the process when executed operable to:
participate, with a plurality of minimalistic connected objects (MCOs) in a computer network, in a build of a current routing topology without any self-optimization, an initial instance of the current routing topology having loop prevention, but having no objective function, no mechanisms for local repair, and no propagating advertisement messages;
transmit, to a distributed intelligence agent (DIA), local state information comprising a corresponding neighbor list and a selected next-hop for the apparatus for the current routing topology;
receive a unicast routing instruction from the DIA that instructs the apparatus how to optimize the current routing topology; and
re-select a next-hop for an updated current routing topology according to the routing instruction from the DIA.

14. A system, comprising:
a plurality of minimalistic connected objects (MCOs) in a computer network, the MCOs configured to select their respective next-hop in a current routing topology without any self-optimization, the MCOs further configured to transmit, to a distributed intelligence agent (DIA), local state information comprising a corresponding neighbor list and the respective selected next-hop; and
a DIA configured to analyze the current routing topology, which is the combined result of the selected next-hops, in comparison to a computed optimal routing topology to determine whether to optimize the current routing topology, and also to transmit, in response to determining that the current routing topology should be optimized, a unicast routing instruction to one or more individual MCOs to instruct those individual MCOs how to optimize the current routing topology;

wherein those individual MCOs are further configured to receive the unicast routing instruction from the DIA, and to re-select a next-hop for an updated current routing topology according to the routing instruction from the DIA.

15. The system as in claim 14, wherein the DIA is further configured to:
receive updated local state information from the MCOs at the DIA;
analyze a corresponding updated current routing topology; and
transmit additional unicast routing instructions in response to determining that the updated current routing topology should be further optimized.

16. The system as in claim 14, wherein the DIA is further configured to compute the optimal routing topology based on at least one of the following: one or more constraints; and meeting one or more required service level agreements (SLAs).

17. The system as in claim 14, wherein determining whether to optimize the current routing topology is based on at least one factor selected from a group consisting of: a total cost differential between the current routing topology and the optimized routing topology; a maximum path cost difference between the current routing topology and the optimized routing topology; a path within the current routing topology not meeting one or more required service level agreements (SLAs); and a number of changes required to optimize the current routing topology.

18. The system as in claim 14, wherein the transmitted routing instruction comprises a new next-hop selection for the respective individual MCO.

19. The system as in claim 14, wherein the local state information comprises at least one of local link cost, local link reliability, local link delay, local link expected transmission count (ETX), and a link-based received signal strength indication (RSSI).

20. The system as in claim 14, wherein the MCOs are further configured to:
participate in a build of a current routing topology without any self-optimization, an initial instance of the current routing topology having loop prevention, but having no objective function, no mechanisms for local repair, and no propagating advertisement messages.

21. The system as in claim 14, wherein the MCOs are further configured to:
transmit updated local state information to the DIA in response to the updated local state information being a significant change from the previously transmitted local state information.

* * * * *